(12) United States Patent
Dewald et al.

(10) Patent No.: US 10,409,079 B2
(45) Date of Patent: Sep. 10, 2019

(54) APPARATUS, SYSTEM, AND METHOD FOR DISPLAYING AN IMAGE USING A PLATE

(71) Applicant: Avegant Corporation, Ann Arbor, MI (US)

(72) Inventors: D. Scott Dewald, Dallas, TX (US); Allan Thomas Evans, Redwood City, MI (US); Chris Westra, San Carlos, CA (US); Warren Cornelius Welch, III, Foster City, MI (US); Andrew Gross, Redwood City, CA (US)

(73) Assignee: Avegant Corp., San Mateo, CA (US)

( * ) Notice: Subject to any disclaimer, the term of this patent is extended or adjusted under 35 U.S.C. 154(b) by 0 days.

(21) Appl. No.: 14/716,873

(22) Filed: May 19, 2015

(65) Prior Publication Data

US 2015/0331246 A1 Nov. 19, 2015

Related U.S. Application Data

(63) Continuation-in-part of application No. 14/590,953, filed on Jan. 6, 2015, now abandoned, and a
(Continued)

(51) Int. Cl.
*G02B 26/00* (2006.01)
*G02B 26/08* (2006.01)
(Continued)

(52) U.S. Cl.
CPC ........... *G02B 27/14* (2013.01); *G02B 3/0006* (2013.01); *G02B 5/1842* (2013.01);
(Continued)

(58) Field of Classification Search
USPC ................ 359/237, 242, 265–267, 270–273, 359/290–292, 295, 298
See application file for complete search history.

(56) References Cited

U.S. PATENT DOCUMENTS

| | | |
|---|---|---|
| 2,149,341 A | 3/1939 | Harrison |
| D132,442 S | 5/1942 | Montgomery |
| (Continued) | | |

FOREIGN PATENT DOCUMENTS

| | | |
|---|---|---|
| CN | 2651774 | 10/2004 |
| CN | 202306016 U | 7/2012 |
| (Continued) | | |

OTHER PUBLICATIONS

"Binocular Disparity", Collins English Dictionary, <http://www.dictionary.com/browse/binocular-disparity, Retrieved on Jan. 11, 2016, 2 pages.
(Continued)

*Primary Examiner* — Brandi N Thomas
(74) *Attorney, Agent, or Firm* — HIPLegal LLP; Judith Szepesi

(57) ABSTRACT

An apparatus (110), system (100), and method (900) for displaying an image (880). Instead of using an expensive configuration of prisms (310) such as TIR prisms (311) or RTIR prisms (312) to direct light (800) to and from a DMD (324), a plate (340) with transmissive (374), reflective (372), and/or polarization (373) characteristics is used. The plate (340) can be implemented in a wide variety of different embodiments using a wide variety of different components and configurations.

22 Claims, 15 Drawing Sheets

Related U.S. Application Data continuation-in-part of application No. 14/678,974, filed on Apr. 4, 2015, now abandoned.

(60) Provisional application No. 61/994,997, filed on May 19, 2014, provisional application No. 61/924,209, filed on Jan. 6, 2014.

(51) Int. Cl.

| | | |
|---|---|---|
| *G02F 1/29* | (2006.01) | |
| *G02B 27/14* | (2006.01) | |
| *G02B 3/00* | (2006.01) | |
| *G02B 5/18* | (2006.01) | |
| *G02B 5/30* | (2006.01) | |
| *G02B 27/01* | (2006.01) | |
| *G02B 27/00* | (2006.01) | |
| *G03B 21/00* | (2006.01) | |
| *G03B 21/20* | (2006.01) | |
| *G03B 21/28* | (2006.01) | |
| *H04N 9/31* | (2006.01) | |

(52) U.S. Cl.
CPC ....... *G02B 5/3033* (2013.01); *G02B 26/0833* (2013.01); *G02B 27/0093* (2013.01); *G02B 27/0172* (2013.01); *G02B 27/0176* (2013.01); *G03B 21/008* (2013.01); *G03B 21/2066* (2013.01); *G03B 21/28* (2013.01); *H04N 9/3102* (2013.01); *G02B 2027/0174* (2013.01); *G02B 2027/0178* (2013.01)

(56) References Cited

U.S. PATENT DOCUMENTS

| | | |
|---|---|---|
| 3,356,439 A | 12/1967 | Magnus |
| D246,259 S | 11/1977 | Nishimura et al. |
| D254,183 S | 2/1980 | Doodson |
| D262,019 S | 11/1981 | Upshaw |
| D270,634 S | 9/1983 | Ungar |
| 4,459,470 A | 7/1984 | Shlichta et al. |
| 4,553,534 A | 11/1985 | Stiegler |
| 4,859,030 A | 8/1989 | Rotier |
| 4,961,626 A | 10/1990 | Fournier et al. |
| D313,092 S | 12/1990 | Nilsson |
| 5,047,006 A | 9/1991 | Brandston et al. |
| 5,095,382 A | 3/1992 | Abe |
| 5,106,179 A | 4/1992 | Kamaya et al. |
| D328,461 S | 8/1992 | Daido et al. |
| D338,010 S | 8/1993 | Yamatogi |
| 5,266,070 A | 11/1993 | Hagiwara et al. |
| 5,303,085 A | 4/1994 | Rallison |
| 5,467,104 A | 11/1995 | Furness et al. |
| 5,552,922 A | 9/1996 | Magarill |
| 5,624,156 A | 4/1997 | Leal et al. |
| D388,114 S | 12/1997 | Ferro |
| 5,794,127 A | 8/1998 | Lansang |
| 5,844,656 A | 12/1998 | Ronzani et al. |
| 5,886,822 A | 3/1999 | Spitzer |
| 5,931,534 A | 8/1999 | Hutter |
| 5,945,965 A | 8/1999 | Inoguchi et al. |
| 5,984,477 A | 11/1999 | Weissman et al. |
| 5,991,085 A | 11/1999 | Rallison et al. |
| 5,991,087 A | 11/1999 | Rallison |
| 6,008,781 A | 12/1999 | Furness et al. |
| 6,016,385 A | 1/2000 | Yee et al. |
| 6,097,543 A * | 8/2000 | Rallison ............. G02B 27/0172 359/630 |
| 6,185,045 B1 | 2/2001 | Hanano |
| 6,342,871 B1 | 1/2002 | Takeyama |
| 6,351,252 B1 | 2/2002 | Atsumi et al. |
| 6,386,706 B1 | 5/2002 | McClure et al. |
| 6,437,915 B2 | 8/2002 | Moseley et al. |
| 6,456,359 B1 * | 9/2002 | Nishikawa ............... B41J 2/465 348/E5.142 |
| D467,580 S | 12/2002 | Mori |
| D484,485 S | 12/2003 | Matsuoka |
| 6,678,897 B2 | 1/2004 | Lindgren |
| 6,721,750 B1 | 4/2004 | Jones et al. |
| 6,724,906 B2 | 4/2004 | Naksen et al. |
| 6,932,090 B1 | 8/2005 | Reschke et al. |
| 7,245,735 B2 | 7/2007 | Han |
| 7,275,826 B2 | 10/2007 | Liang |
| D556,187 S | 11/2007 | Feng |
| D560,654 S | 1/2008 | Feng |
| D567,215 S | 4/2008 | Lee |
| D570,825 S | 6/2008 | Schultz et al. |
| 7,388,960 B2 | 6/2008 | Kuo et al. |
| 7,483,200 B1 * | 1/2009 | Pan ................... G02B 26/0841 345/108 |
| D587,683 S | 3/2009 | Ham et al. |
| 7,604,348 B2 | 10/2009 | Jacobs et al. |
| 7,697,203 B2 | 4/2010 | Cha et al. |
| 7,735,154 B2 | 6/2010 | Gellis et al. |
| D632,668 S | 2/2011 | Brunner et al. |
| D638,397 S | 5/2011 | McManigal |
| D640,256 S | 6/2011 | So |
| 7,959,296 B2 | 6/2011 | Cowan et al. |
| 8,006,320 B1 | 8/2011 | Rohbani |
| 8,057,036 B2 | 11/2011 | Hess et al. |
| 8,094,120 B2 | 1/2012 | Ratai |
| 8,094,927 B2 | 1/2012 | Jin et al. |
| 8,106,938 B2 | 1/2012 | Tzschoppe |
| D656,480 S | 3/2012 | McManigal et al. |
| 8,144,079 B2 | 3/2012 | Mather et al. |
| 8,144,274 B2 | 3/2012 | Lee |
| D657,344 S | 4/2012 | Brunner et al. |
| 8,149,342 B2 | 4/2012 | Ijzerman et al. |
| 8,154,800 B2 | 4/2012 | Kean et al. |
| 8,162,482 B2 | 4/2012 | DeCusatis et al. |
| D660,823 S | 5/2012 | Hardi et al. |
| D660,824 S | 5/2012 | Hardi et al. |
| 8,194,058 B2 | 6/2012 | Shestak et al. |
| 8,208,715 B2 | 6/2012 | Lau et al. |
| 8,212,810 B2 | 7/2012 | Naske et al. |
| 8,243,126 B2 | 8/2012 | Louwsma et al. |
| 8,244,027 B2 | 8/2012 | Takahashi |
| 8,284,235 B2 | 10/2012 | Held et al. |
| D673,136 S | 12/2012 | Kelly et al. |
| D673,520 S | 1/2013 | Tan |
| D674,767 S | 1/2013 | Brunner et al. |
| 8,362,974 B2 | 1/2013 | Miyake et al. |
| D675,595 S | 2/2013 | Cho et al. |
| D683,329 S | 5/2013 | Hagelin |
| 8,451,229 B2 | 5/2013 | Otsuki et al. |
| 8,508,830 B1 | 8/2013 | Wang |
| 8,545,013 B2 | 10/2013 | Hwang et al. |
| D693,791 S | 11/2013 | Troy |
| D695,263 S | 12/2013 | Mogili |
| 8,605,935 B1 | 12/2013 | Huang |
| D697,495 S | 1/2014 | Lian |
| D699,702 S | 2/2014 | Chen |
| D704,704 S | 5/2014 | Tatara et al. |
| D709,880 S | 7/2014 | Kim et al. |
| D715,255 S | 10/2014 | Nunez et al. |
| D720,721 S | 1/2015 | Lu |
| D722,041 S | 2/2015 | Sparks et al. |
| 8,964,298 B2 | 2/2015 | Haddick et al. |
| D724,560 S | 3/2015 | Galler |
| D727,278 S | 4/2015 | Solomon et al. |
| D727,280 S | 4/2015 | Levine |
| D727,281 S | 4/2015 | Levine |
| D727,288 S | 4/2015 | Yamasaki et al. |
| D728,512 S | 5/2015 | Nakagawa |
| D729,196 S | 5/2015 | Liu |
| D729,198 S | 5/2015 | Brunner et al. |
| 9,036,849 B2 | 5/2015 | Thompson et al. |
| 9,042,948 B2 | 5/2015 | Serota |
| D733,090 S | 6/2015 | Petersen |
| 9,158,115 B1 | 10/2015 | Worley et al. |
| 9,223,136 B1 | 12/2015 | Braun et al. |
| 9,529,191 B2 | 12/2016 | Sverdrup et al. |
| 2002/0070590 A1 | 6/2002 | Carstens |
| 2002/0089469 A1 | 7/2002 | Cone et al. |

(56) References Cited

U.S. PATENT DOCUMENTS

| | | |
|---|---|---|
| 2002/0175880 A1 | 11/2002 | Melville et al. |
| 2002/0186180 A1 | 12/2002 | Duda |
| 2003/0058209 A1 | 3/2003 | Balogh |
| 2003/0095081 A1 | 5/2003 | Furness et al. |
| 2003/0164814 A1 | 9/2003 | Starkweather et al. |
| 2003/0210801 A1 | 11/2003 | Naksen et al. |
| 2003/0227465 A1 | 12/2003 | Morgan et al. |
| 2004/0113867 A1 | 6/2004 | Tomine et al. |
| 2005/0116922 A1 | 6/2005 | Kim |
| 2005/0195277 A1 | 9/2005 | Yamasaki |
| 2005/0206583 A1 | 9/2005 | Lemelson et al. |
| 2006/0028400 A1 | 2/2006 | Lapstun et al. |
| 2006/0181482 A1 | 8/2006 | Iaquinto |
| 2006/0181484 A1 | 8/2006 | Sprague et al. |
| 2006/0238717 A1 | 10/2006 | Maximus et al. |
| 2007/0081248 A1 | 4/2007 | Wu |
| 2007/0091272 A1 | 4/2007 | Lerner et al. |
| 2007/0093118 A1 | 4/2007 | Pond et al. |
| 2007/0097277 A1* | 5/2007 | Hong ............... G02B 3/14 349/11 |
| 2007/0216876 A1* | 9/2007 | Narikawa ............ H04N 9/3114 353/84 |
| 2007/0273983 A1 | 11/2007 | Hebert |
| 2008/0158672 A1 | 7/2008 | McCosky |
| 2009/0015917 A1 | 1/2009 | Iwamoto et al. |
| 2009/0039692 A1 | 2/2009 | Tuckey et al. |
| 2009/0126984 A1* | 5/2009 | Saneto ............... H05K 9/0096 174/350 |
| 2009/0152915 A1 | 6/2009 | Krasna et al. |
| 2009/0206641 A1 | 8/2009 | Brown |
| 2009/0262044 A1 | 10/2009 | Otsuki et al. |
| 2009/0276238 A1 | 11/2009 | Filipovich et al. |
| 2010/0007852 A1 | 1/2010 | Bietry et al. |
| 2010/0053729 A1 | 3/2010 | Tilleman et al. |
| 2010/0073469 A1 | 3/2010 | Fateh |
| 2010/0103676 A1 | 4/2010 | Noeth |
| 2010/0182688 A1 | 7/2010 | Kim et al. |
| 2010/0231579 A1 | 9/2010 | Kanbayashi et al. |
| 2010/0301640 A1 | 12/2010 | Heiser |
| 2011/0002533 A1 | 1/2011 | Inoue et al. |
| 2011/0007132 A1 | 1/2011 | Redmann et al. |
| 2011/0018903 A1 | 1/2011 | Lapstun et al. |
| 2011/0037829 A1 | 2/2011 | Hata |
| 2011/0044046 A1 | 2/2011 | Abu-Ageel |
| 2011/0063203 A1 | 3/2011 | Hong |
| 2011/0085727 A1 | 4/2011 | Yoon et al. |
| 2011/0096147 A1 | 4/2011 | Yamazaki et al. |
| 2011/0109133 A1 | 5/2011 | Galbreath et al. |
| 2011/0134229 A1 | 6/2011 | Matsumoto et al. |
| 2011/0134497 A1* | 6/2011 | Horimai ............... G03H 1/30 359/11 |
| 2011/0141240 A1 | 6/2011 | Dutta et al. |
| 2011/0141244 A1 | 6/2011 | Vos et al. |
| 2011/0157696 A1 | 6/2011 | Bennett et al. |
| 2011/0193248 A1 | 8/2011 | Hsu |
| 2011/0227820 A1 | 9/2011 | Haddick et al. |
| 2011/0254834 A1 | 10/2011 | Jeon et al. |
| 2011/0273365 A1 | 11/2011 | West et al. |
| 2011/0273662 A1 | 11/2011 | Hwang et al. |
| 2012/0007800 A1 | 1/2012 | Jaroslaw |
| 2012/0033061 A1 | 2/2012 | Ko et al. |
| 2012/0050503 A1 | 3/2012 | Kraft |
| 2012/0059464 A1 | 3/2012 | Zhao |
| 2012/0069131 A1 | 3/2012 | Abelow |
| 2012/0084652 A1 | 4/2012 | Bauza et al. |
| 2012/0086917 A1 | 4/2012 | Okuda et al. |
| 2012/0105310 A1 | 5/2012 | Sverdrup et al. |
| 2012/0105740 A1 | 5/2012 | Jannard et al. |
| 2012/0120498 A1 | 5/2012 | Harrison et al. |
| 2012/0127062 A1 | 5/2012 | Bar-Zeev et al. |
| 2012/0195454 A1 | 8/2012 | Nishihara et al. |
| 2012/0212398 A1 | 8/2012 | Border et al. |
| 2012/0236030 A1 | 9/2012 | Border et al. |
| 2012/0244812 A1 | 9/2012 | Rosener |
| 2012/0262477 A1 | 10/2012 | Buchheit |
| 2012/0262549 A1 | 10/2012 | Ferguson |
| 2012/0262562 A1* | 10/2012 | Fukutake ............. G02B 21/367 348/79 |
| 2012/0280941 A1 | 11/2012 | Hu |
| 2012/0307357 A1 | 12/2012 | Choi et al. |
| 2013/0002660 A1 | 1/2013 | Chikazawa |
| 2013/0010055 A1 | 1/2013 | Raju et al. |
| 2013/0044939 A1 | 2/2013 | Li |
| 2013/0057961 A1 | 3/2013 | Evans et al. |
| 2013/0120265 A1 | 5/2013 | Horii et al. |
| 2013/0127980 A1 | 5/2013 | Haddick et al. |
| 2013/0147791 A1 | 6/2013 | Gilberton et al. |
| 2013/0160039 A1 | 6/2013 | Mentz et al. |
| 2013/0182086 A1 | 7/2013 | Evans et al. |
| 2013/0194244 A1 | 8/2013 | Tamir |
| 2013/0201080 A1 | 8/2013 | Evans et al. |
| 2013/0258463 A1 | 10/2013 | Evans et al. |
| 2013/0278631 A1 | 10/2013 | Border et al. |
| 2013/0293531 A1 | 11/2013 | Cao et al. |
| 2013/0307842 A1 | 11/2013 | Grinberg et al. |
| 2013/0314303 A1 | 11/2013 | Osterhout et al. |
| 2013/0314615 A1 | 11/2013 | Allen et al. |
| 2013/0342904 A1 | 12/2013 | Richards |
| 2014/0043320 A1 | 2/2014 | Tosaya et al. |
| 2014/0063055 A1 | 3/2014 | Osterhout et al. |
| 2014/0139652 A1 | 5/2014 | Alden et al. |
| 2014/0139927 A1 | 5/2014 | Hiraide |
| 2014/0200079 A1 | 7/2014 | Bathiche et al. |
| 2014/0253698 A1 | 9/2014 | Evans et al. |
| 2015/0028755 A1 | 1/2015 | Chang et al. |
| 2015/0060811 A1 | 3/2015 | Shiratori |
| 2015/0091781 A1 | 4/2015 | Yu et al. |
| 2015/0097759 A1 | 4/2015 | Evans et al. |
| 2015/0103152 A1 | 4/2015 | Qin |
| 2016/0018639 A1 | 1/2016 | Spitzer et al. |
| 2016/0033771 A1 | 2/2016 | Tremblay et al. |
| 2016/0195718 A1 | 7/2016 | Evans |
| 2016/0198133 A1 | 7/2016 | Evans |
| 2016/0291326 A1 | 10/2016 | Evans et al. |
| 2016/0292921 A1 | 10/2016 | Evans et al. |
| 2016/0295202 A1 | 10/2016 | Evans et al. |
| 2017/0068311 A1 | 3/2017 | Evans et al. |
| 2017/0139209 A9 | 5/2017 | Evans et al. |

FOREIGN PATENT DOCUMENTS

| | | |
|---|---|---|
| JP | 2012253471 | 12/2012 |
| WO | 2008070683 A1 | 6/2008 |
| WO | 2011097226 A1 | 8/2011 |
| WO | 2011137034 A1 | 11/2011 |
| WO | 2012000457 A1 | 1/2012 |
| WO | 2012098534 A1 | 7/2012 |
| WO | 2013012259 A2 | 1/2013 |

OTHER PUBLICATIONS

Chapter 2-Principles of Stereoscopic Depth Perception and Reproduction, 2007.

PCT/US14/023799, International Preliminary Report on Patentability, dated Jul. 21, 2014, 6 pages.

PCT/US14/23799, International Search Report, dated Jul. 21, 2014, 2 pages.

PCT/US14/59579 International Search Report, dated Jan. 5, 2015, 1 page.

PCT/US2014/059579 International Preliminary Report on Patentability, dated Apr. 12, 2016, 6 pages.

PCT/US2015/010372 International Preliminary Report on Patentability, dated Jul. 12, 2016, 6 pages.

PCT/US2015/010372 International Search Report, dated Apr. 21, 2015, 2 pages.

PCT/US2015/010377 International Search Report, dated Apr. 28, 2015, 2 pages.

PCT/US2015/010377 International Preliminary Report on Patentability, dated Jul. 12, 2016, 6 pages.

PCT/US2015/031649 International Search Report, dated Nov. 24, 2015, 3 pages.

(56) References Cited

OTHER PUBLICATIONS

PCT/US2015/031649 Written Opinion of the International Searching Authority, dated Nov. 24, 2015, 6 pages.
PCT/YS2015/010380 International Preliminary Report on Patentability, dated Jul. 12, 2016, 7 pages.
PCT/YS2015/010380 International Search Report, dated Apr. 22, 2015, 2 pages.
Qian, Ning, "Binocular Disparity and the Perception of Depth", Neuron, vol. 18, Mar. 1997, 359-368.
Rainbow Symphony, Pulfrich 3D Glasses, <http://www.3dglasses.net/Pulfrich%203D%20Glasses.htm>, Retrieved on Jul. 27, 2016, 2 pages.
Ruxandra Serbanescu, "Polarization of light", 2009.
Bertolami, Joe, "De-3D: Watch 3D Movies in Comfortable 2D.", Oct. 2, 2010, 4 pages.
Fateh Sina et al: "Rebalancing the Visual System of People with Amblyopia "Lazy Eye" by Using HMD and Image Enhancement", Jul. 19, 2009, Network and Parallel Computing; [Lecture Notes in Computer Science; Lect.Notes computer], Springer International Publishing, Cham, pp. 560-565, XP047355900.
Flacy, Mike. "Vending Machines Stocked with $70 3d Glasses Added to Theaters.", Aug. 11, 2011, 3 pages.

\* cited by examiner

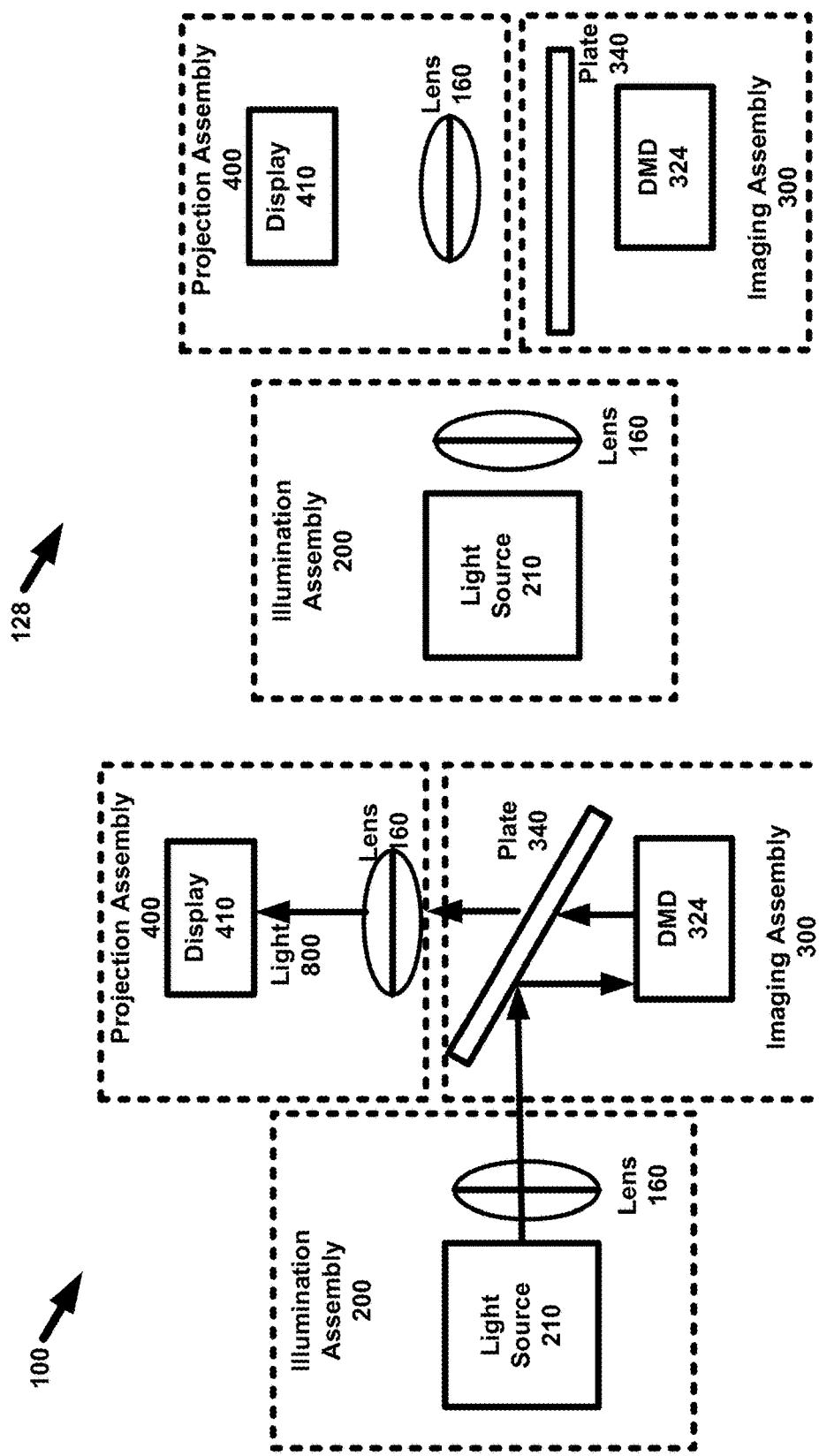

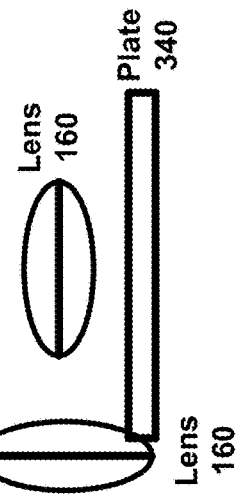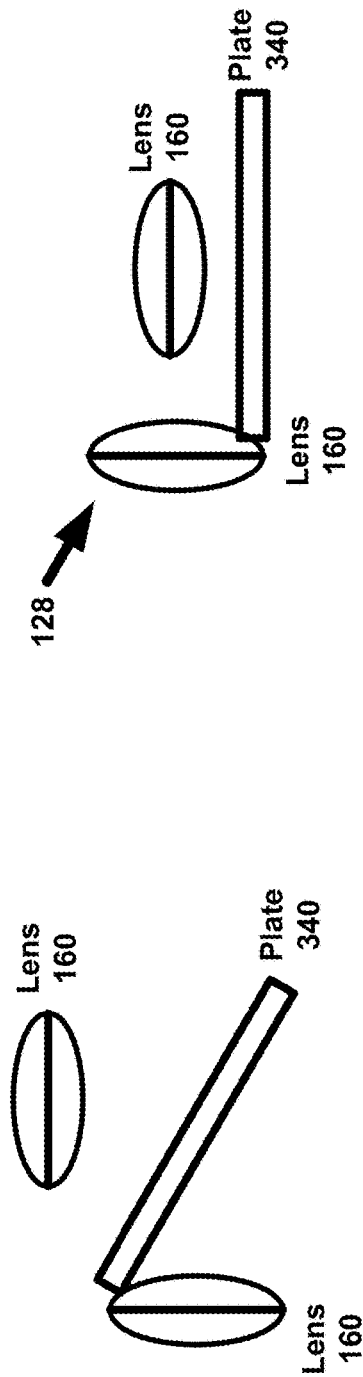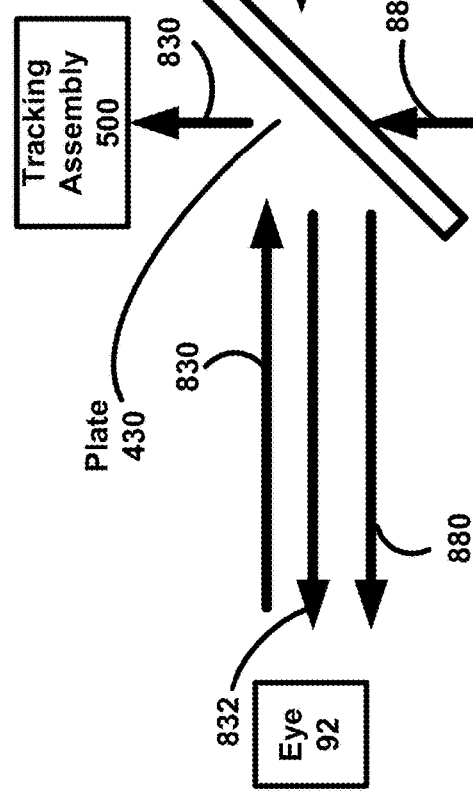

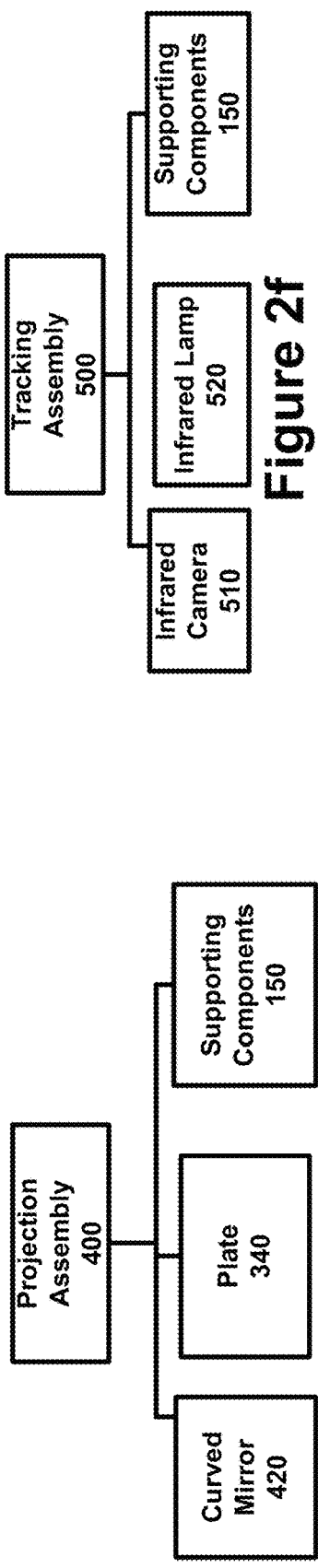
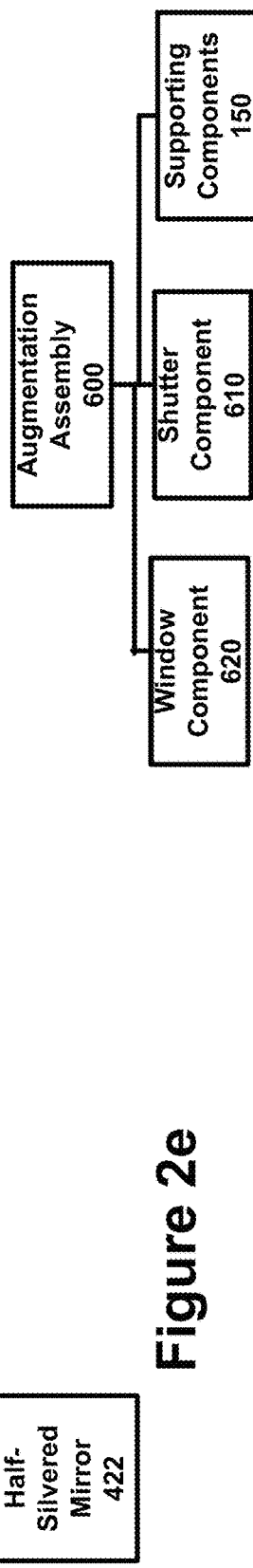
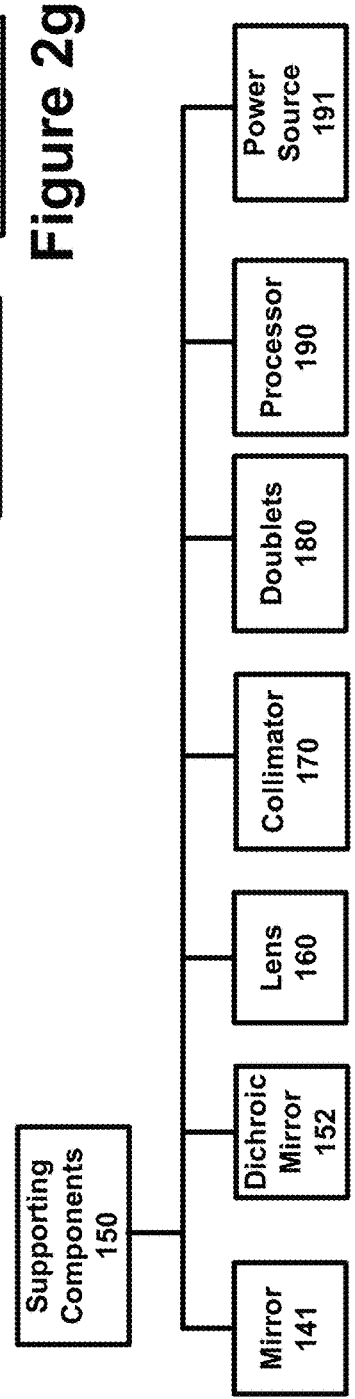

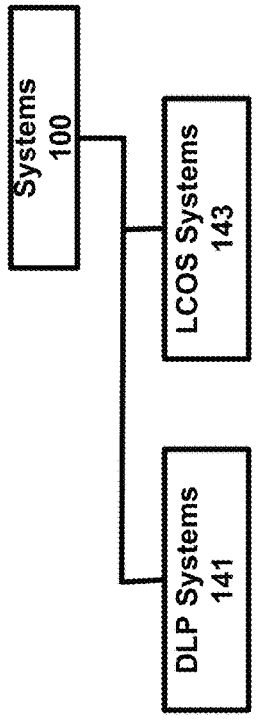
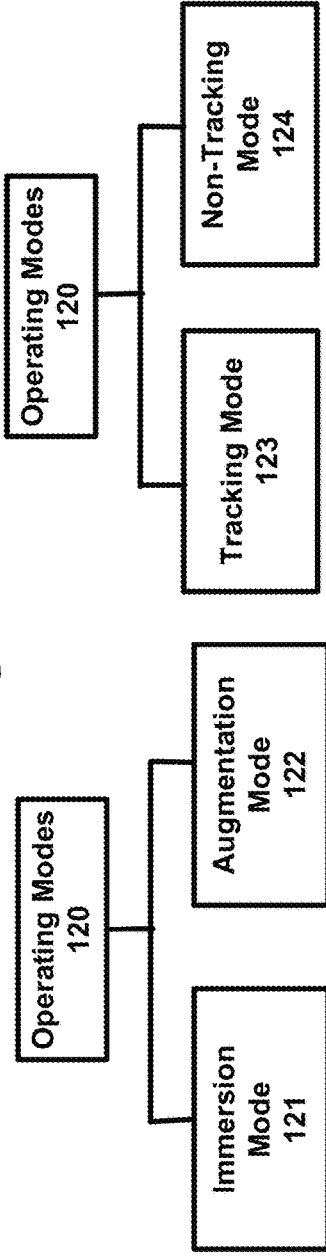
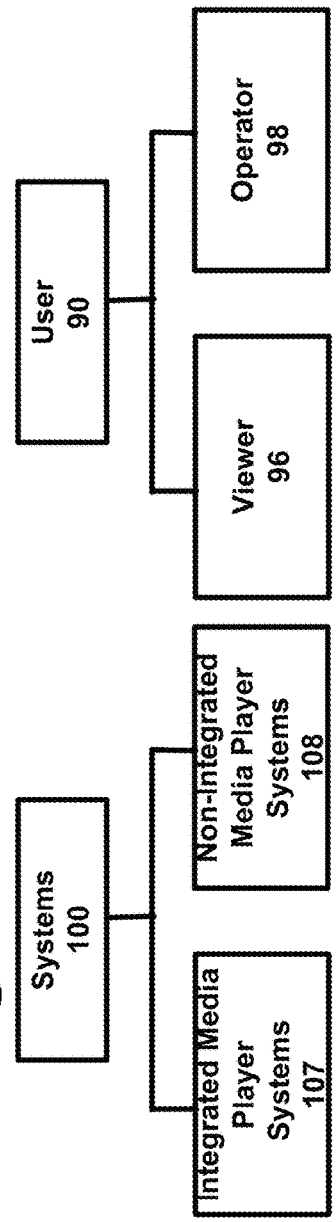
Figure 4d
Figure 4e
Figure 4f
Figure 4g
Figure 4h

APPARATUS, SYSTEM, AND METHOD FOR DISPLAYING AN IMAGE USING A PLATE

RELATED APPLICATIONS

This utility patent application claims priority to the following U.S. patent applications which are also incorporated by reference in their entirety: (1) "NEAR-EYE DISPLAY APPARATUS AND METHOD" (Ser. No. 61/924,209) filed on Jan. 6, 2014; (2) "APPARATUS AND METHOD FOR ILLUMINATING A NEAR-EYE DISPLAY" (Ser. No. 61/994,997) filed on May 19, 2014; (3) APPARATUS, SYSTEM, AND METHOD FOR SELECTIVELY VARYING THE IMMERSION OF A MEDIA EXPERIENCE" (Ser. No. 14/678,974) and (4) " SYSTEM, METHOD, AND APPARATUS FOR DISPLAYING AN IMAGE USING A CURVED MIRROR AND A PARTIALLY TRANSPARENT PLATE" (Ser. No. 14/590,953) filed on Jan. 6, 2015. Subject matter in addition to those included in the above referenced applications is included in this application.

BACKGROUND OF THE INVENTION

The invention is an apparatus, system, and method (collectively the "system") that can display an image to a viewer. More specifically, the system can utilize a plate that is partially transmissive and partially reflective in lieu of expensive prisms such as TIR or RTIR prisms to direct light to and from a modulator.

A key factor in any image display device is light. Light is an important raw material in any image display device. Light is generated by a light source, modulated into an image, and then finalized and focused into an image that is made accessible to a viewer. Within these different action steps, light must be directed from place to place. Light can be a challenging resource to manage because light is comprised of very small units that are capable of moving independent of each other. Light moves incredibly fast, and light readily changes direction upon hitting different objects. The vision of human beings is based on light bouncing around and hitting different objects and reaching the human eye.

In the context of the artificially created images of an image display device, light is conventionally thought of as a precious resource. Many of the optical components in an image display device perform the function of directing light from one place in the optic chain to the next step of the optic chain. This is not a trivial task. At each step in the process, light is inevitably lost. If too much light is lost, there is not sufficient illumination to display an image. As a result, the history of image display devices is dominated by an overriding desire for optical efficiency.

That conventional thinking has prevented innovation in the field of image display devices, and is particularly undesirable and inappropriate in the context of personal displays such as head-mounted and other forms of near-eye displays.

SUMMARY OF THE INVENTION

The invention is an apparatus, system, and method (collectively the "system") that can display an image to a viewer. More specifically, the system can utilize a plate that is partially transmissive and partially reflective in lieu of expensive prisms such as TIR or RTIR prisms to direct light to and from a modulator.

The plate serves as a "traffic cop" for light reaching the modulator (such as an DMD) to form an image as well as light leaving the DMD (or other type of modulator) that is modulated to form the desired image. This functionality is typically performed by prisms such as TIR prisms, RTIR prisms, and other prisms known in the art (collectively "prisms"). Such prisms are highly expensive, and the present system can be implemented without such prisms while still providing viewers with high quality images.

The plate of the system can be implemented in a wide variety of different ways using a wide variety of different materials and configurations. Different embodiments of the system can provide specific advantages and functions over mere replacement of the applicable prisms.

BRIEF DESCRIPTION OF THE DRAWINGS

Many features and inventive aspects of the system are illustrated in the various drawings described briefly below. However, no patent application can expressly disclose in words or in drawings, all of the potential embodiments of an invention. Variations of known equivalents are implicitly included. In accordance with the provisions of the patent statutes, the principles, functions, and modes of operation of the systems, apparatuses, and methods (collectively the "system") are explained and illustrated in certain preferred embodiments. However, it must be understood that the inventive systems may be practiced otherwise than is specifically explained and illustrated without departing from its spirit or scope. All components illustrated in the drawings below and associated with element numbers are named and described in Table 1 provided in the Detailed Description section.

FIG. 1c also illustrates some of the instances where light 800 is lost in the process.

FIG. 1g is a block diagram illustrating an example of a system actively using a plate to display an image.

FIG. 1h is a block diagram illustrating an example of a system in a compressed operating mode to reduce the space taken up by the plate.

FIG. 1l is a block diagram illustrating an example of the position of a plate with respect to two lenses while the system is displaying an image.

FIG. 1m is a block diagram illustrating an example of the position of a plate with respect to two lenses while the system is in a compressed operating mode.

FIG. 1n is a block diagram illustrating an example of how a plate can function as a traffic cop in directing the flow of light to various assemblies and components of the system.

FIG. 2e is a hierarchy diagram illustrating an example of different components that can be included in a projection assembly.

FIG. 2f is a hierarchy diagram illustrating an example of different components that can be included in the sensor assembly (which can also be referred to as a tracking assembly).

FIG. 2g is hierarchy diagram illustrating examples of different types of supporting components that can be included in the structure and function of the system.

FIG. 4d is hierarchy diagram illustrating an example of different display/projection technologies that can be incorporated into the system, such as DLP-based applications.

FIG. 4e is a hierarchy diagram illustrating an example of different operating modes of the system pertaining to immersion and augmentation.

FIG. 4f is a hierarchy diagram illustrating an example of different operating modes of the system pertaining to the use of sensors to detect attributes of the user and/or the user's use of the system.

FIG. 4g is a hierarchy diagram illustrating an example of different categories of system implementation based on whether or not the device(s) are integrated with media player components.

FIG. 4h is hierarchy diagram illustrating an example of two roles or types of users, a viewer of an image and an operator of the system.

DETAILED DESCRIPTION

Figure 1B:
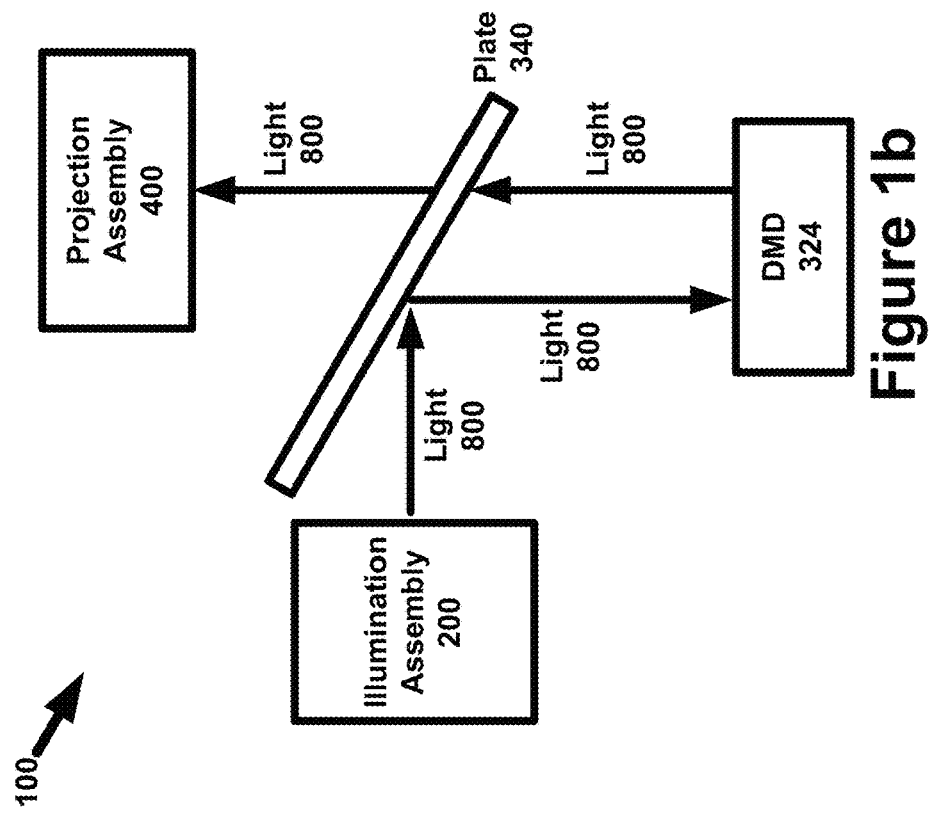
FIG. 1b is a block diagram illustrating an example of a system that utilizes a plate in lieu of a configuration of prisms.

The invention is an apparatus, system, and method (collectively the "system") that can display an image to a viewer. More specifically, the system can utilize a plate that is partially transmissive and partially reflective in lieu of expensive prisms such as TIR or RTIR prisms to direct light to and from a DMD. All element numbers referenced in the text below are referenced in Table 1 provided further below.

I. Overview

Any image display system or device can be divided into at least three primary components: (1) an illumination assembly that provides light the light in which to form an image; (2) an imaging assembly that modulates that light into what will become the displayed image; and (3) a projection assembly that projects the modulated light to an intended destination where it can be accessed by one or more viewers. The third step of projecting the modulated light typically involves focusing the light and other processes which modify the light in certain respects. Thus, one can say that the image generated by the imaging assembly is actually only an interim image, since the light comprising the image will be modified in certain ways in the time between it leaves the imaging assembly and reaches the eyes of a viewer.

The heart of any image display device is the imaging assembly. That is where a modulator transforms light generated by a light source into something a viewer will want to see. Common examples of modulators include DMDs, LCOS panels, and LCD panels. A DMD is a reflection-based light modulator. DMD stands for A. Prior Art FIG. 1 a is a block diagram illustrating an example of prior art approach to the display of an image. The illumination assembly 200 generates light 800. That light encounters a configuration of two prisms 310 which collectively direct the unmodulated light 800 from the illumination assembly 200 towards the DMD 324 and the modulated light 800 from the DMD towards the projection assembly 400 so that the image 880 can be accessed by one or more viewers 96.

For the purpose of providing a comprehensive illustration, the flow of light 800 that ultimately ends up comprising the displayed image 880 is displayed by a single line of light 800. In reality, there are multitudes of light rays 800 generated by the illumination assembly 200. Some of those rays of light 800 are lost at each step in the process. FIG. 1a is shows the pathway of light 800 that makes it into the image 880, not the light that is lost during the process. As illustrated in FIG. 1a: (1) unmodulated light 800 generated by the illumination assembly 200 reaches the left prism 310 and is reflected by the second prism 310 towards the DMD 324 (or other form of modulator 320); and (2) modulated light 800 from the DMD 324 (or other form of modulator (320) passes through the configuration of prisms 310 to the projection assembly 400 where the light 800 in the form of the image 880 is made accessible to a viewer 96.

Each time light 800 reaches another component in the Figure, light 800 is lost to the process. However, the configuration of prisms 310 does possess a high optical efficiency.

B. Use of Plate

Figure 1A:
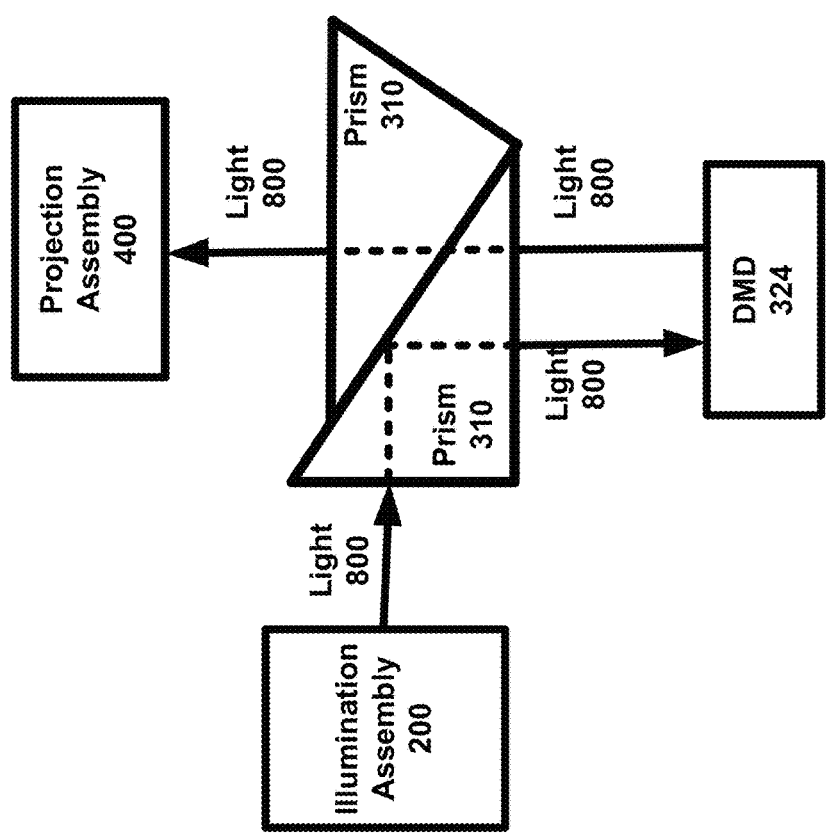
FIG. 1a is a block diagram illustrating an example of a prior art image display that uses prisms to direct light to and from a DMD.

FIG. 1b is a block diagram illustrating an alternative to the prior art approach of FIG. 1a. There is no prism 310 in FIG. 1b. Instead, a plate 340 with both reflective 372 and transmissive 374 properties is used to direct unmodulated light 800 to the DMD 324. The optical chain 870 (which can also be referred to as an optical pathway 870) of light 800 that actually reaches is illustrated in unbroken lines.

In contrast to FIG. 1a where light 800 is reflected towards the modulator 320 by the juncture between the two prisms 310, it is the surface of the plate 340 that reflects the light 800 towards the modulator 320 in FIG. 1b. The light 800 represented by the downward arrow pointing towards the modular 320 illustrates light 800 that encountered the reflective 372 characteristics of the plate 340. Conversely, the light 800 represented by the upward arrow from the modulator 320 through the plate 340 to the projection assembly 400 represents modulated light 800 that encountered the transmissive 374 aspects of the plate 340. The plate 340 functions as both a reflector of light 800 as well as a transparent object through which light 800 passes through.

Figure 1D:
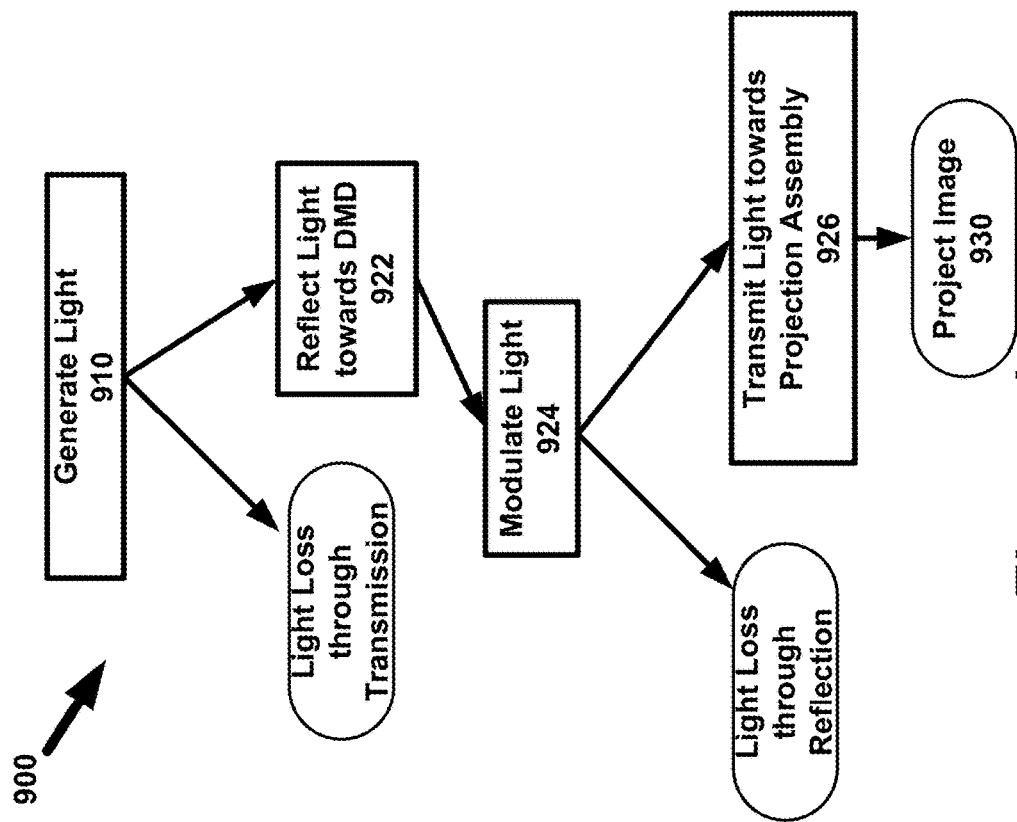
FIG. 1d is a flow chart diagram illustrating an example of a method for displaying an image that utilizes a plate.
Figure 1C:
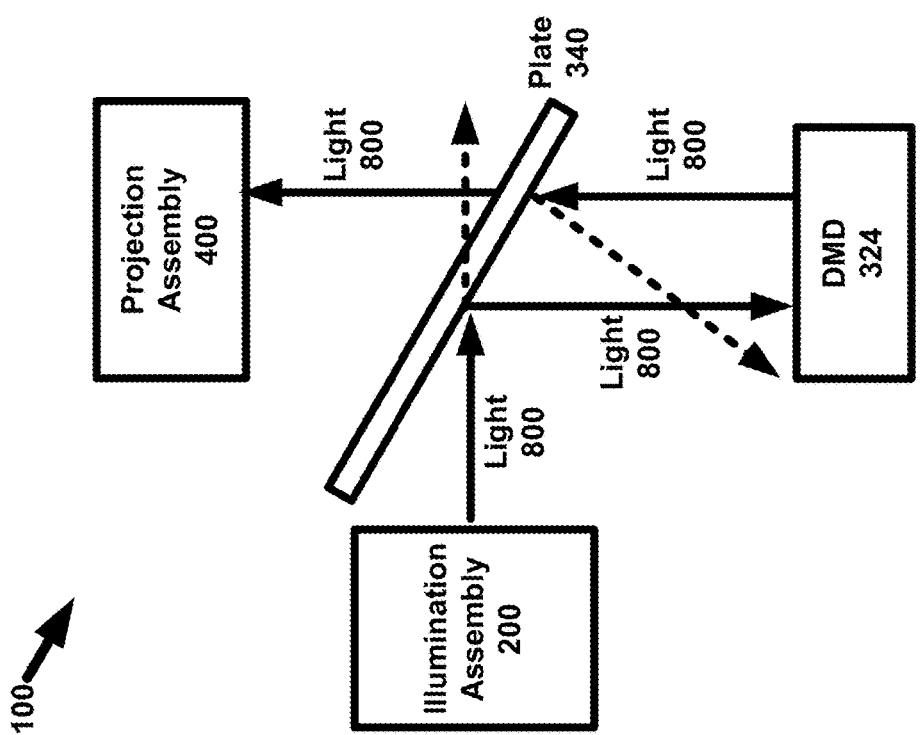
FIG. 1c is a block diagram illustrating an example a system that utilizes a plate in lieu of a configuration of prisms.

FIG. 1c is a somewhat less simplified version of FIG. 1b in that some of the lost light 800 is illustrated in the Figure. For example the dotted horizontal line pointing to the right represents light 800 that was transmitted through the plate 340 rather than being deflected by it. That light 800 is lost to the process of forming an image. Similarly, the dotted line from the plate 340 directed downwards at an angle towards the DMD 324 represents modulated light 800 from the DMD 324 that was reflected back rather than transmitted through the plate 340.

C. Process Flow View

FIG. 1d is a flow chart of a method 900 for displaying an image 880 that utilizes a plate 340. At 910, the system 100 generates light 800 utilizing an illumination assembly 200. That light 800 reaches the plate 340. Some of the light from 910 is lost through the transmissive 374 aspects of the plate 340, while other rays of light 910 from 910 are reflected at 922 towards the modulator 320. The modulator 320 modulates the light 800, forming an interim image 850 that is directed back to the plate 340. Some of that light 800 is lost through the reflective 372 characteristics of the plate 340 while other rays of light 800 are transmitted at 926 for inclusion in the image 880 that is displayed to viewers 96.

D. Variations of the Plate

The plate 340 can be comprised of glass 342, plastic film 344, or combinations of both glass 342 and plastic 344. Some embodiments of the plate 344 can involve multiple layers 346 as well as various coatings 348. The plate 340 can be implemented as a dynamic plate 341. Plastic film 344 embodiments of the plate 340 can be implemented as modulated film 345 in some embodiments.

To enhance the transmissive 374 impact of the plate 340, the plate 340 can be implemented with an aperture 350 and even dynamic apertures 352 that are changed on an image to image basis. Plates 340 can involve a variety of different gradients 360, including adjustable gradients 362 such as adjustable diffractive gradients 364. Different plates 340 can have different magnitudes of reflectiveness 372 and transmissiveness 374. Some plates 340 can impact the polarization 373 of light 800 that reaches the plate 340. Adjustable gradients 362 can be used to implement desirable optical effects 380. The plate 340 can include holographic elements 382, and be embodied in as a micro lens array 384. The plate 340 can also be embodied in as a collapsible plate 340 so that the plate 340 takes up less room when the system 100 is not displaying images 880.

Not only can different embodiments of the plate 340 can involve different magnitudes of reflectiveness 372, transmissiveness 374, and polarization 373, but such characteristics can also vary with respect to where the light 800 falls on the spectrum 802 light wavelengths. Some embodiments can involve uniform attributes across a full spectrum 803 of light 803. Other embodiments may differentiate between infrared 806, ultraviolet 807, visible light 804, or even within a partial spectrum of visible light 804.

Figure 1F:
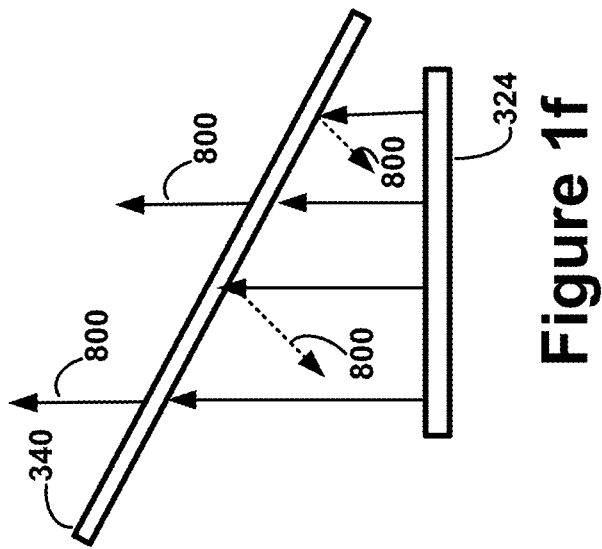
FIG. 1f is a diagram illustrating an example of different light pathways resulting when light travels from the DMD towards the plate. About 50% of the light is transmitted through the plate and about 50% of the light is lost by reflection back from the plate.
Figure 1E:
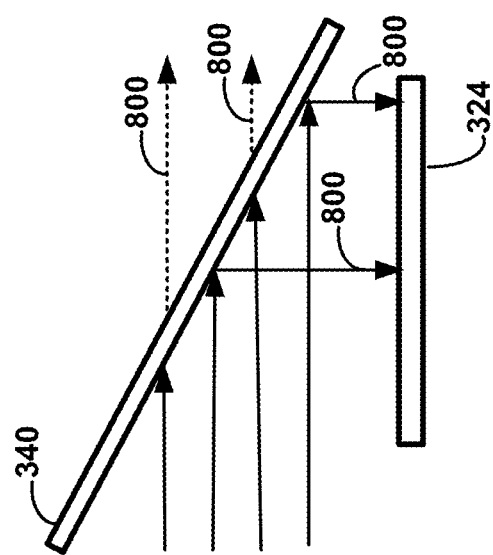
FIG. 1e is a diagram illustrating an example of different light pathways resulting when light travels from an illumination assembly to the plate. About 50% of the light is reflected towards the DMD and about 50% of the light is lost by passing through the plate.

FIGS. 1e and 1f illustrate examples of a plate 340 that is approximately 50% reflective 372 and 50% transmissive 374. Many embodiments will involve ranges between about 60/40% and 40/60%. However, the system 100 can be implemented far outside those ranges.

FIGS. 1g and 1l illustrate examples of the system 100 using a plate 340 to display an image 880. FIGS. 1h and 1m illustrate corresponding examples of such a plate 340 in compressed mode 128, where the plate 340 is collapsed to save space while the system 100 is not being used to display images 880.

FIG. 1n is an example of the different assemblies and components that can utilize the plate 340 to perform the function of a "traffic cop" with respect to the flow of light 800.

II. Assemblies and Components

Figure 2A:
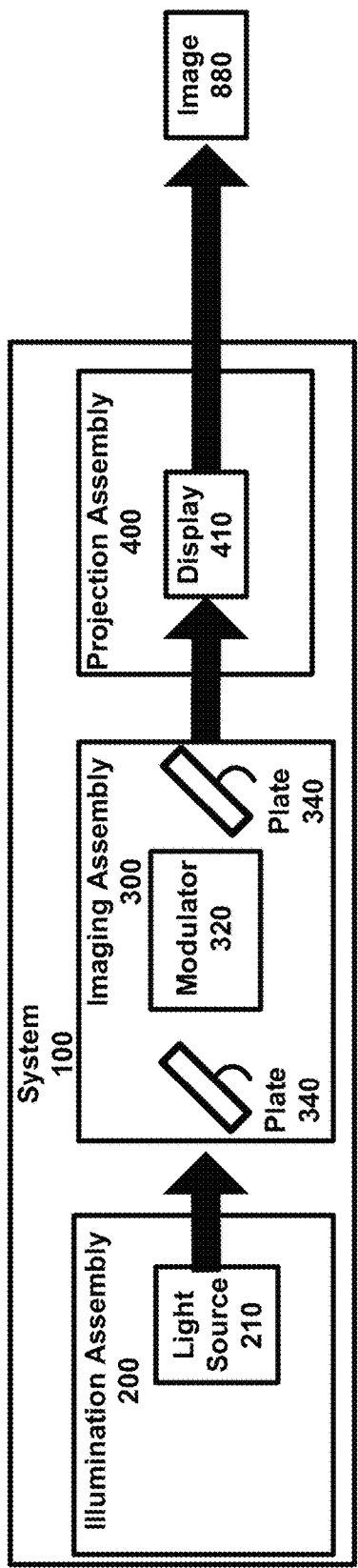
FIG. 2a is a block diagram illustrating an example of different assemblies, components, and light that can be present in the operation of the system.

The system 100 can be described in terms of assemblies of components that perform various functions in support of the operation of the system 100. FIG. 2a is a block diagram of a system 100 comprised of an illumination assembly 200 that supplies light 800 to an imaging assembly 300. A modulator 320 of the imaging assembly 300 uses the light 800 from the illumination assembly 200 to create the image 880 that is displayed by the system 100. The diagram is from the point of view of a pathway of light 800 that forms the image 880, so the plate 340 appears twice within the imaging assembly 300 because light 800 touches the plate 340 before reaching the modulator 320 and after leaving the modulator 320.

As illustrated in the Figure, the system 100 can also include a projection assembly 400 that directs the image 880 from the imaging assembly 300 to a location where it can be accessed by one or more users 90, a display 410. The image 880 generated by the imaging assembly 300 will often be modified in certain ways before it is displayed by the system 100 to users 90, and thus the image generated by the imaging assembly 300 can also be referred to as an interim image 850 or a work-in-process image 850.

A. Illumination Assembly

An illumination assembly 200 performs the function of supplying light 800 to the system 100 so that an image 880 can be displayed. The illumination assembly 200 can include a light source 210 for generating light 800. The illumination assembly 200 generates the light 800 that is used and processed by other assemblies of the system 100.

Figure 2B:
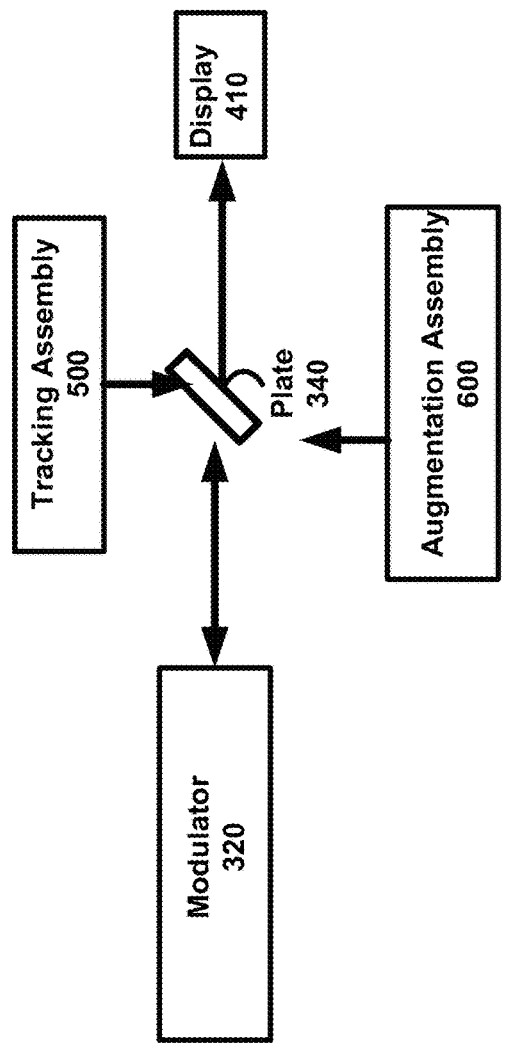
FIG. 2b is a block diagram similar to FIG. 2a, except that the disclosed system also includes a tracking assembly (which can also be referred to as a sensor assembly) and an augmentation assembly
Figure 2C:
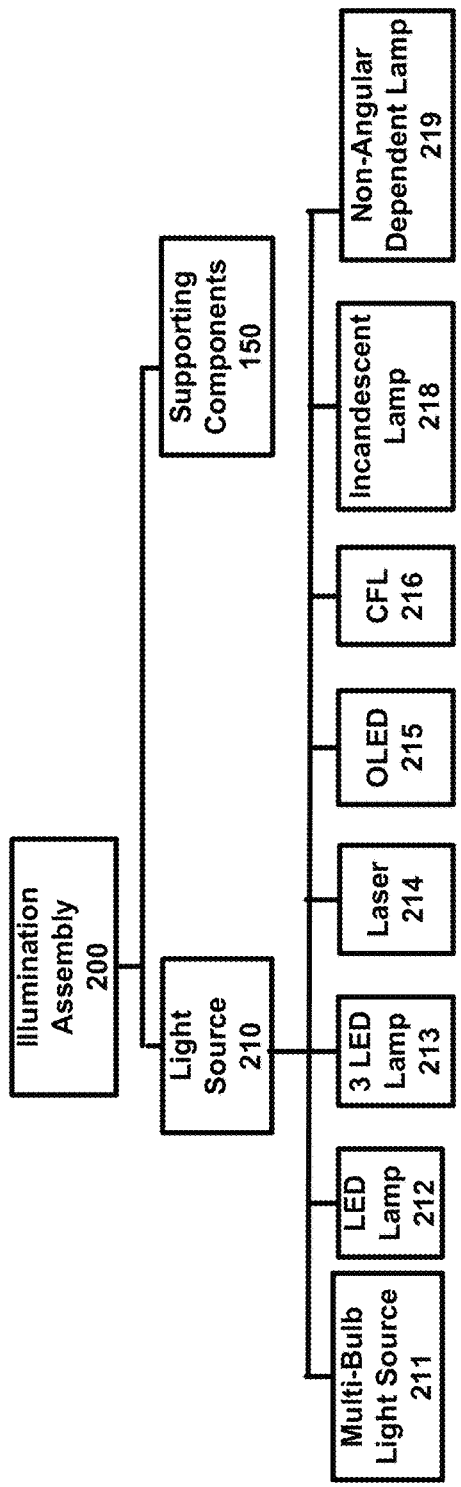
FIG. 2c is a hierarchy diagram illustrating an example of different components that can be included in an illumination assembly.
Figure 2D:
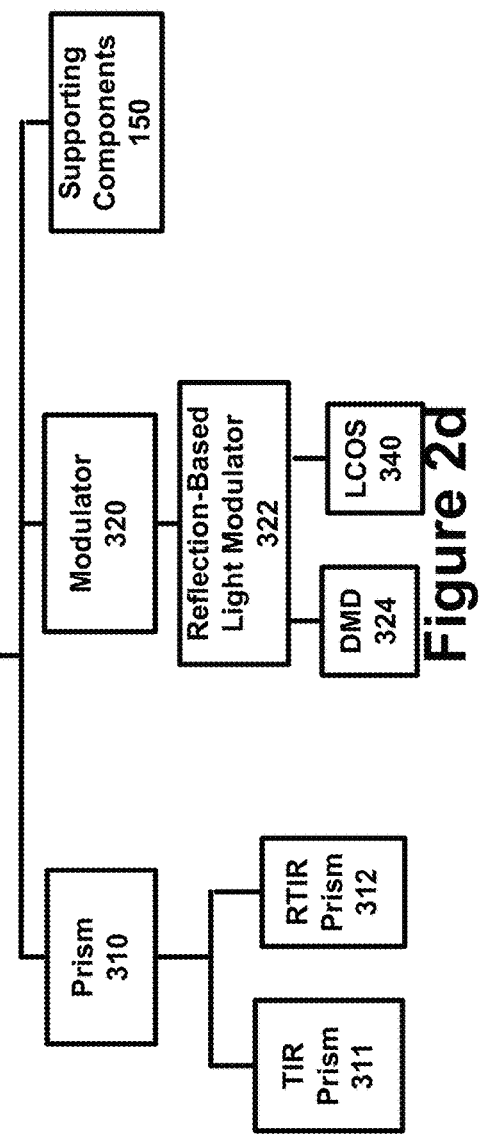
FIG. 2d is a hierarchy diagram illustrating an example of different components that can be included in an imaging assembly.

FIG. 2c is a hierarchy diagram illustrating an example of different components that can be included in the illumination assembly 200. Those components can include but are not limited a wide range of light sources 210, a diffuser assembly 280, and a variety of supporting components 150. Examples of light sources 210 can include but are such as a multi-bulb light source 211, an LED lamp 212, a 3 LED lamp 213, a laser 214, an OLED 215, a CFL 216, an incandescent lamp 218, and a non-angular dependent lamp 219. The light source 210 is where light 800 is generated and moves throughout the rest of the system 100. Thus, each light source 210 is a location 230 for the origination of light 800.

In many instances, it will be desirable to use a 3 LED lamp as a light source, which one LED designated for each primary color of red, green, and blue.

B. Imaging Assembly

An imaging assembly 300 performs the function of creating the image 880 from the light 800 supplied by the illumination assembly 200. As illustrated in FIG. 2a, a modulator 320 can transform the light 800 supplied by the illumination assembly 200 into the image 880 that is displayed by the system 100. As illustrated in FIG. 2b, the image 880 generated by the imaging assembly 300 can sometimes be referred to as an interim image 850 because the image 850 may be focused or otherwise modified to some degree before it is directed to the location where it can be experienced by one or more users 90.

Imaging assemblies 300 can vary significantly based on the type of technology used to create the image. Display technologies such as DLP (digital light processing), LCD (liquid-crystal display), LCOS (liquid crystal on silicon), and other methodologies can involve substantially different components in the imaging assembly 300.

FIG. 2f is a hierarchy diagram illustrating an example of some of the different components that can be utilized in the imaging assembly 300 for the system 100. A prism 310 can be very useful component in directing light to and/or from the modulator 320. DLP applications will typically use an array of TIR prisms 311 or RTIR prisms 312 to direct light to and from a DMD 324. As discussed above, the plate 340 can replace the need for prisms 310 used in the system 100.

A modulator 320 (sometimes referred to as a light modulator 320) is the device that modifies or alters the light 800, creating the image 880 that is to be displayed. Modulators 320 can operate using a variety of different attributes of the modulator 320. A reflection-based modulator 322 uses the reflective-attributes of the modulator 320 to fashion an image 880 from the supplied light 800. Examples of reflection-based modulators 322 include but are not limited to the DMD 324 of a DLP display and some LCOS (liquid crystal on silicon) panels 340. A transmissive-based modulator 321 uses the transmissive-attributes of the modulator 320 to fashion an image 880 from the supplied light 800. Examples of transmissive-based modulators 321 include but are not limited to the LCD (liquid crystal display) 330 of an LCD display and some LCOS panels 340. The imaging assembly 300 for an LCOS or LCD system 100 will typically have a combiner cube or some similar device for integrating the different one-color images into a single image 880.

The imaging assembly 300 can also include a wide variety of supporting components 150.

C. Projection Assembly

As illustrated in FIG. 2b, a projection assembly 400 can perform the task of directing the image 880 to its final destination in the system 100 where it can be accessed by users 90. In many instances, the image 880 created by the imaging assembly 300 will be modified in at least some minor ways between the creation of the image 880 by the modulator 320 and the display of the image 880 to the user 90. Thus, the image 880 generated by the modulator 320 of the imaging assembly 400 may only be an interim image 850, not the final version of the image 880 that is actually displayed to the user 90.

FIG. 2e is a hierarchy diagram illustrating an example of different components that can be part of the projection assembly 400. A display 410 is the final destination of the image 880, i.e. the location and form of the image 880 where it can be accessed by users 90. Examples of displays 410 can include an active screen 412, a passive screen 414, an eyepiece 416, and a VRD eyepiece 418.

The projection assembly 400 can also include a variety of supporting components 150 as discussed below. A plate 340 can also serve as a component within the projection assembly 400 because the plate 340 is an excellent tool for managing the flow of light 800 between different system 100 components, as illustrated in FIG. 2b.

D. Sensor/Tracking Assembly

FIG. 2b illustrates an example of the system 100 that includes a tracking assembly 500 (which is also referred to as a sensor assembly 500). The sensor assembly 500 can be used to capture information about the user 90, the user's interaction with the image 880, and/or the exterior environment in which the user 90 and system 100 are physically present.

As illustrated in FIG. 2f, the sensor assembly 500 can include a sensor 510, typically a camera such as an infrared camera for capturing an eye-tracking attribute 530 pertaining to eye movements of the viewer 96. A lamp 520 such as an infrared light source to support the functionality of the infrared camera, and a variety of different supporting components 150. In many embodiments of the system 100 that include a tracking assembly 500, the tracking assembly 500 will utilize components of the projection assembly 400 such as the configuration of a curved mirror 420 operating in tandem with a partially transparent plate 340. Such a configuration can be used to capture infrared images of the eye 92 of the viewer 96 while simultaneously delivering images 880 to the eye 92 of the viewer 96.

The sensor assembly 500 can also include sensors 510 intended to capture visual images, video, sounds, motion, position, and other information from the operating environment 80.

E. Augmentation Assembly

An augmentation assembly 600 can allow natural light from the exterior environment 80 in through a window component 620 in the system 100 (the window component 620 can include a shutter component 610) that is capable of being opened or closed.

F. Supporting Components

Light 800 can be a challenging resource to manage. Light 800 moves quickly and cannot be constrained in the same way that most inputs or raw materials can be. FIG. 2j is a hierarchy diagram illustrating an example of some supporting components 150, many of which are conventional optical components. Any display technology application will involve conventional optical components such as mirrors 141 (including dichroic mirrors 152) lenses 160, collimators 170, and plates 180. Similarly, any powered device requires a power source 191 and a device capable of displaying an image 880 is likely to have a processor 190.

III. VRD Visor Embodiments

The system 100 can be implemented with respect to a wide variety of different display technologies 140, including DLP systems 141, LCD systems 142, and LCOS system 143. The various drawings focus on DLP systems 141 because it is believed that the plate 340 is particularly useful as a substitute for TIR prisms 311 and RTIR prisms 312.

Figure 3B:
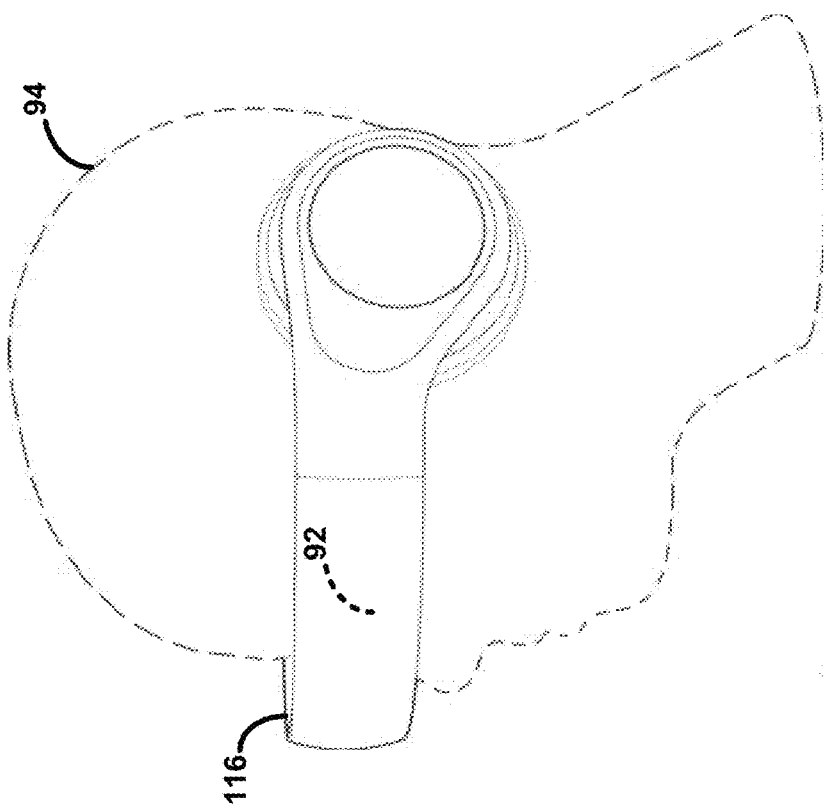
FIG. 3b is environmental diagram illustrating an example of a side view of a user wearing a VRD apparatus embodying the system.
Figure 3A:
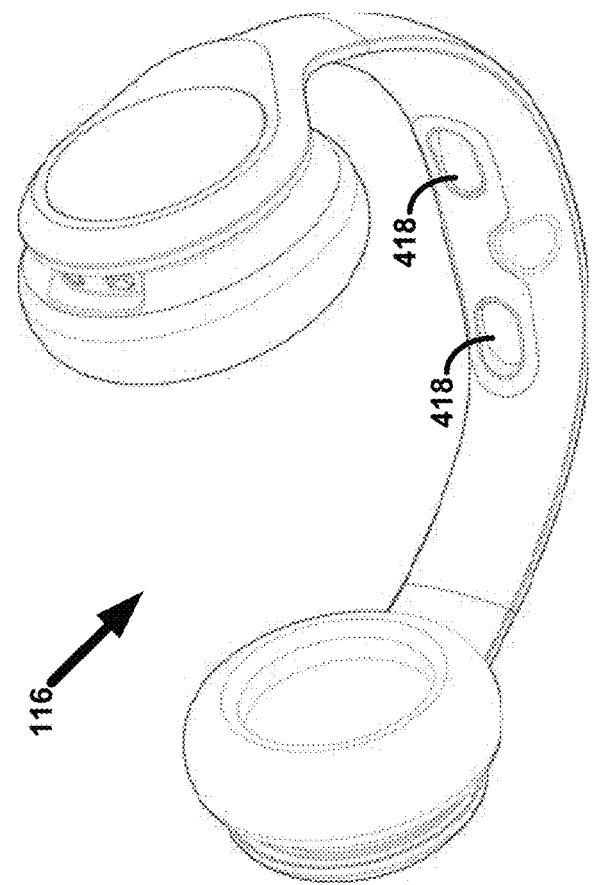
FIG. 3a is diagram of a perspective view of a VRD apparatus embodiment of the system.

FIG. 3a is a perspective diagram illustrating an example of a VRD visor apparatus 116. Two VRD eyepieces 418 provide for directly projecting the image 880 onto the eyes of the user 90.

FIG. 3b is a side view diagram illustrating an example of a VRD visor apparatus 116 being worn on the head 94 of a user 90. The eyes 92 of the user 90 are blocked by the apparatus 116 itself, with the apparatus 116 in a position to project the image 880 on the eyes 92 of the user 90.

Figure 3C:
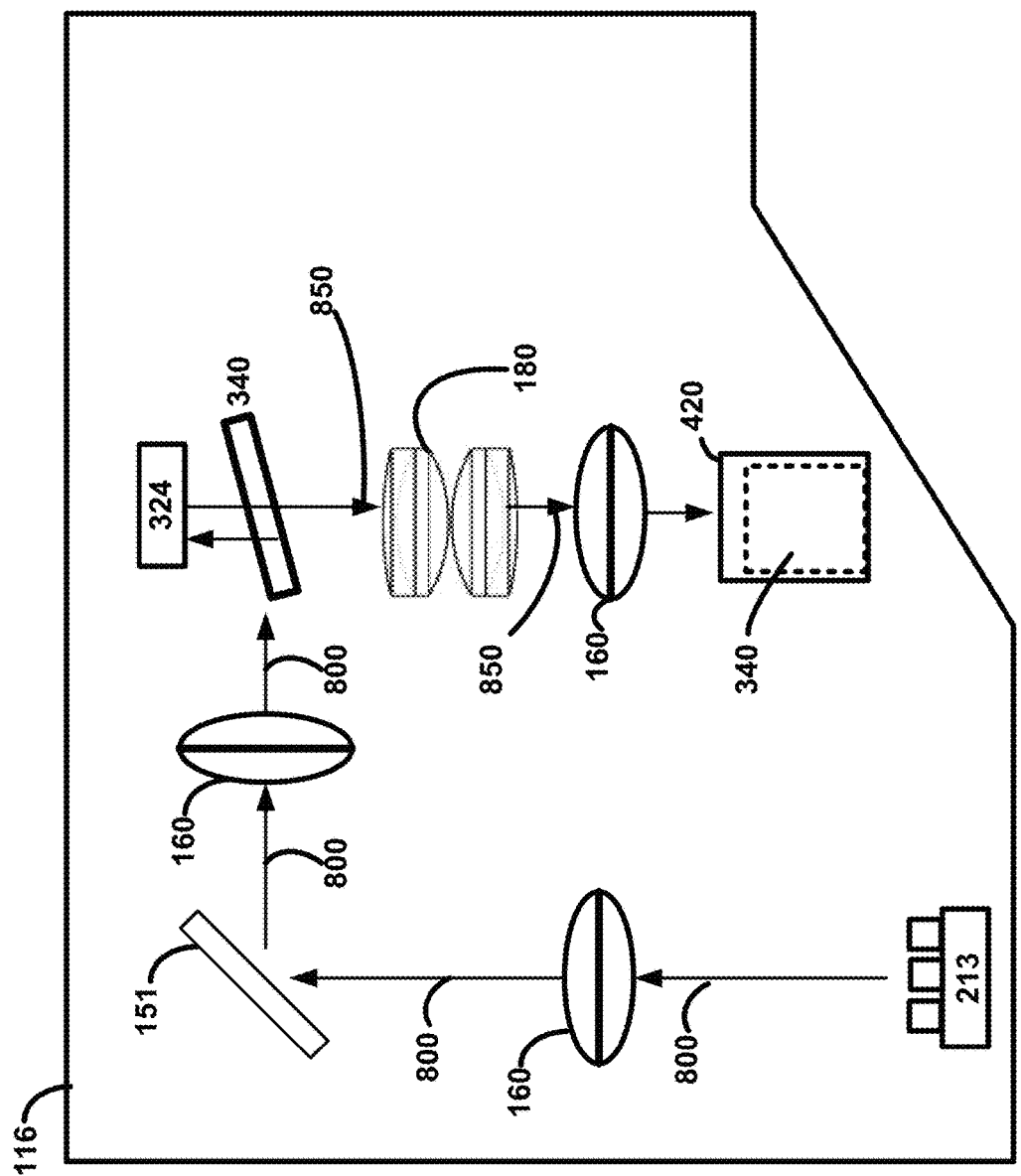
FIG. 3c is a configuration diagram illustrating an example of the components that can be used in a VRD apparatus.

FIG. 3c is a component diagram illustrating an example of a VRD visor apparatus 116 for the left eye 92. A mirror image of FIG. 3c would pertain to the right eye 92.

A 3 LED light source 213 generates the light which passes through a condensing lens 160 that directs the light 800 to a mirror 151 which reflects the light 800 to a shaping lens 160 prior to the entry of the light 800 into an imaging assembly 300 comprised of a plate 340 and a DMD 324. The interim image 850 from the imaging assembly 300 passes through another lens 160 that focuses the interim image 850 into a final image 880 that is viewable to the user 90 through the eyepiece 416.

IV. Alterative Embodiments

No patent application can expressly disclose in words or in drawings, all of the potential embodiments of an invention. Variations of known equivalents are implicitly included. In accordance with the provisions of the patent statutes, the principles, functions, and modes of operation of the systems 100, methods 900, and apparatuses 110 (collectively the "system" 100) are explained and illustrated in certain preferred embodiments. However, it must be understood that the inventive systems 100 may be practiced otherwise than is specifically explained and illustrated without departing from its spirit or scope.

The description of the system 100 provided above and below should be understood to include all novel and non-obvious alternative combinations of the elements described herein, and claims may be presented in this or a later application to any novel non-obvious combination of these elements. Moreover, the foregoing embodiments are illustrative, and no single feature or element is essential to all possible combinations that may be claimed in this or a later application.

The system 100 represents a substantial improvement over prior art display technologies. Just as there are a wide range of prior art display technologies, the system 100 can be similarly implemented in a wide range of different ways. The innovation of using a plate 340 in lieu of prisms 340 to direct light 800 be implemented at a variety of different scales, utilizing a variety of different display technologies, in both immersive and augmenting contexts, and in both one-way (no sensor feedback from the user 90) and two-way (sensor feedback from the user 90) embodiments.

A. Variations of Scale

Display devices can be implemented in a wide variety of different scales. The monster scoreboard at EverBanks Field (home of the Jacksonville Jaguars) is a display system that is 60 feet high, 362 feet long, and comprised of 35.5 million LED bulbs. The scoreboard is intended to be viewed simultaneously by tens of thousands of people. At the other end of the spectrum, the GLYPH™ visor by Avegant Corporation is a device that is worn on the head of a user and projects visual images directly in the eyes of a single viewer. Between those edges of the continuum are a wide variety of different display systems.

The system 100 displays visual images 808 to users 90 with enhanced light with reduced coherence. The system 100 can be potentially implemented in a wide variety of different scales.

Figure 4A:
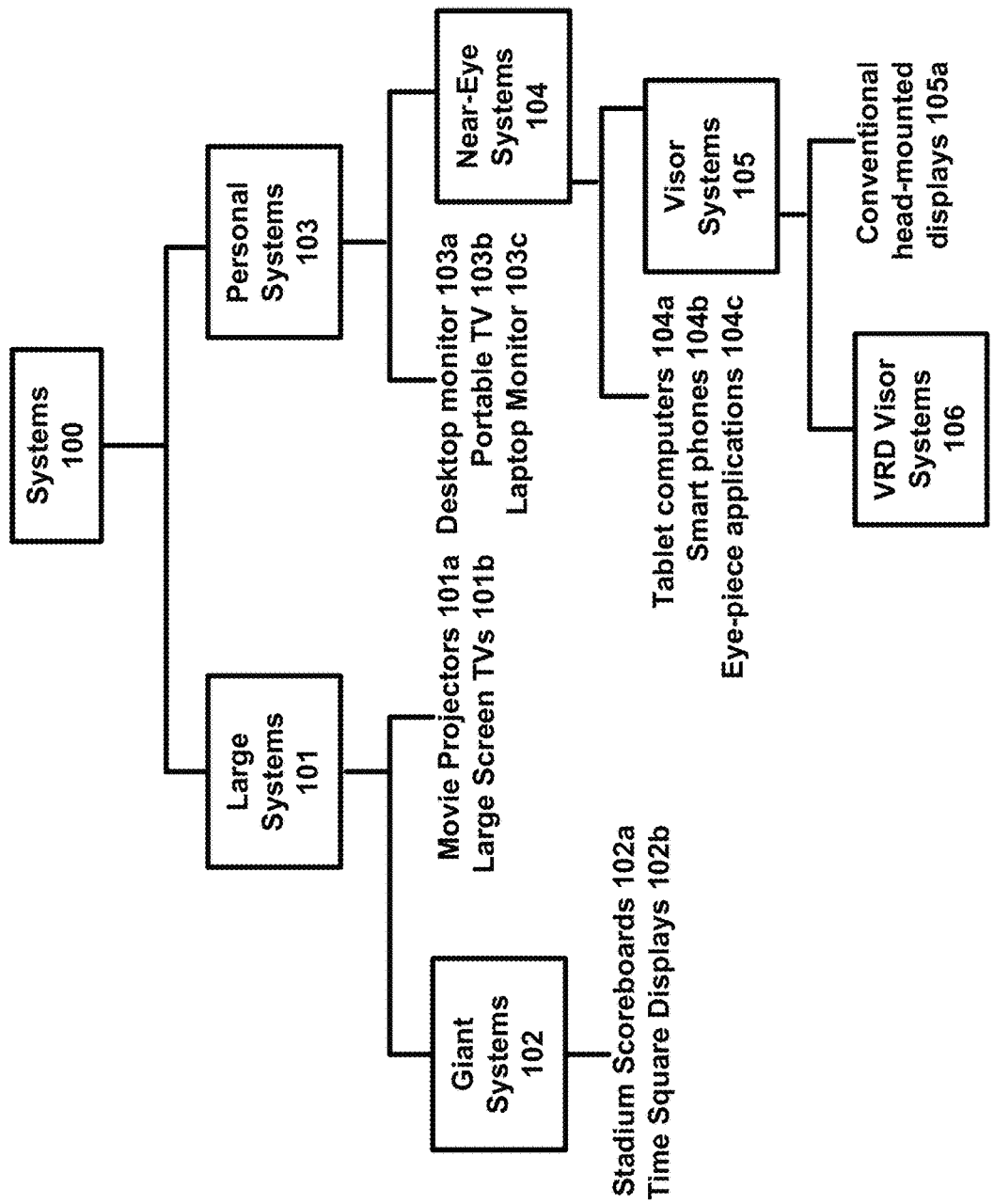
FIG. 4a is a hierarchy diagram illustrating an example of the different categories of display systems that the innovative system can be potentially be implemented in, ranging from giant systems such as stadium scoreboards to VRD visor systems that project visual images directly on the retina of an individual user.

FIG. 4a is a hierarchy diagram illustrating various categories and subcategories pertaining to the scale of implementation for display systems generally, and the system 100 specifically. As illustrated in FIG. 4a, the system 100 can be implemented as a large system 101 or a personal system 103

1. Large Systems

A large system 101 is intended for use by more than one simultaneous user 90. Examples of large systems 101 include movie theater projectors, large screen TVs in a bar, restaurant, or household, and other similar displays. Large systems 101 include a subcategory of giant systems 102, such as stadium scoreboards 102a, the Time Square displays 102b, or other or the large outdoor displays such as billboards off the expressway.

2. Personal Systems

A personal system 103 is an embodiment of the system 100 that is designed to for viewing by a single user 90. Examples of personal systems 103 include desktop monitors 103a, portable TVs 103b, laptop monitors 103c, and other similar devices. The category of personal systems 103 also includes the subcategory of near-eye systems 104.

a. Near-Eye Systems

A near-eye system 104 is a subcategory of personal systems 103 where the eyes of the user 90 are within about 12 inches of the display. Near-eye systems 104 include tablet computers 104a, smart phones 104b, and eye-piece applications 104c such as cameras, microscopes, and other similar devices. The subcategory of near-eye systems 104 includes a subcategory of visor systems 105.

b. Visor Systems

A visor system 105 is a subcategory of near-eye systems 104 where the portion of the system 100 that displays the visual image 200 is actually worn on the head 94 of the user 90. Examples of such systems 105 include virtual reality visors, Google Glass, and other conventional head-mounted displays 105a. The category of visor systems 105 includes the subcategory of VRD visor systems 106.

c. VRD Visor Systems

A VRD visor system 106 is an implementation of a visor system 105 where visual images 200 are projected directly on the eyes of the user. The technology of projecting images directly on the eyes of the viewer is disclosed in a published patent application titled "IMAGE GENERATION SYSTEMS AND IMAGE GENERATING METHODS" (U.S. Ser. No. 13/367,261) that was filed on Feb. 6, 2012, the contents of which are hereby incorporated by reference.

3. Integrated Apparatus

Figure 4B:
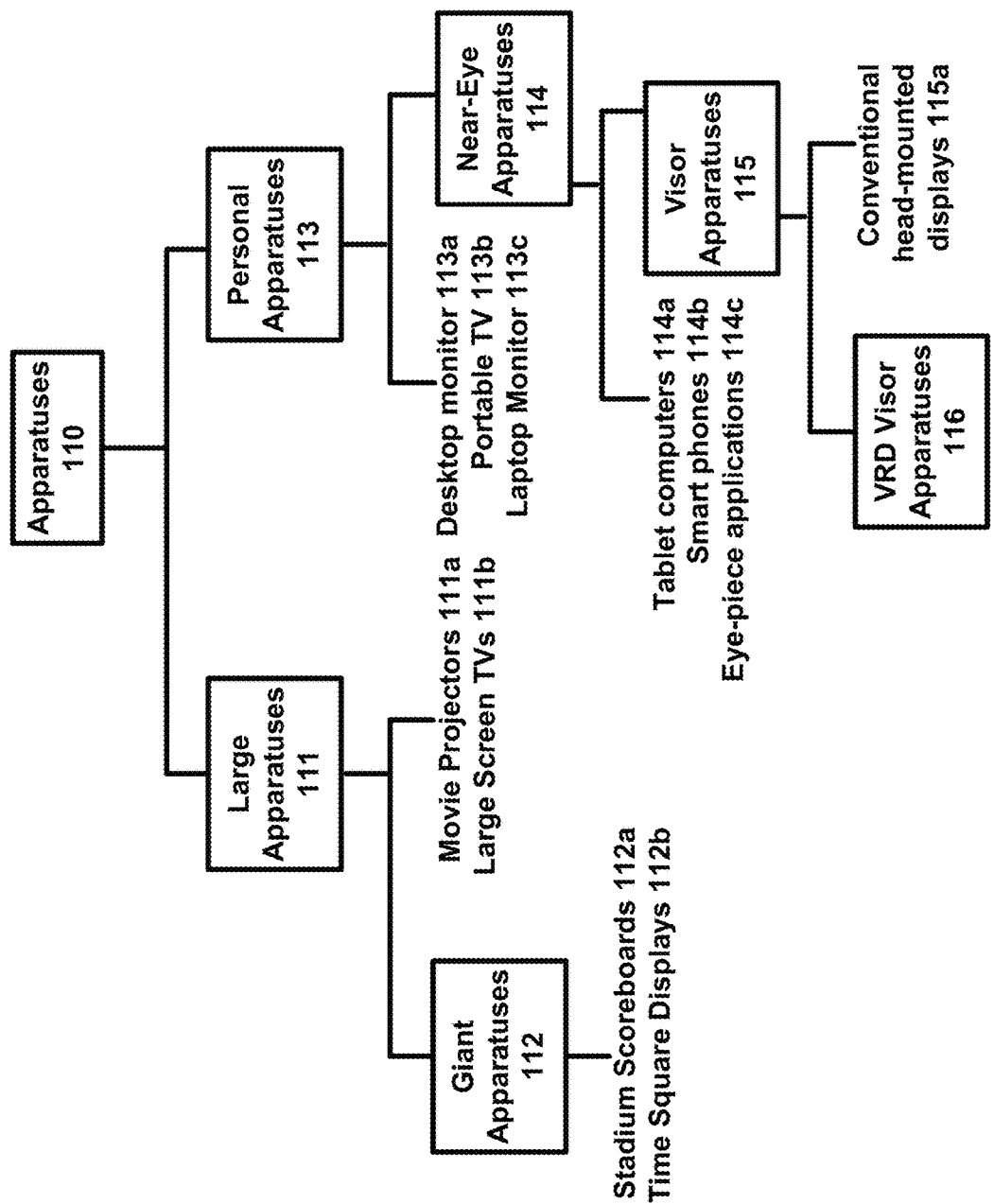
FIG. 4b is a hierarchy diagram illustrating an example of different categories of display apparatuses.

Media components tend to become compartmentalized and commoditized over time. It is possible to envision display devices where an illumination assembly 120 is only temporarily connected to a particular imaging assembly 160. However, in most embodiments, the illumination assembly 120 and the imaging assembly 160 of the system 100 will be permanently (at least from the practical standpoint of users 90) into a single integrated apparatus 110. FIG. 4b is a hierarchy diagram illustrating an example of different categories and subcategories of apparatuses 110. FIG. 4b closely mirrors FIG. 5a. The universe of potential apparatuses 110 includes the categories of large apparatuses 111 and personal apparatuses 113. Large apparatuses 111 include the subcategory of giant apparatuses 112. The category of personal apparatuses 113 includes the subcategory of near-eye apparatuses 114 which includes the subcategory of visor apparatuses 115. VRD visor apparatuses 116 comprise a category of visor apparatuses 115 that implement virtual retinal displays, i.e. they project visual images 200 directly into the eyes of the user 90.

Figure 4C:
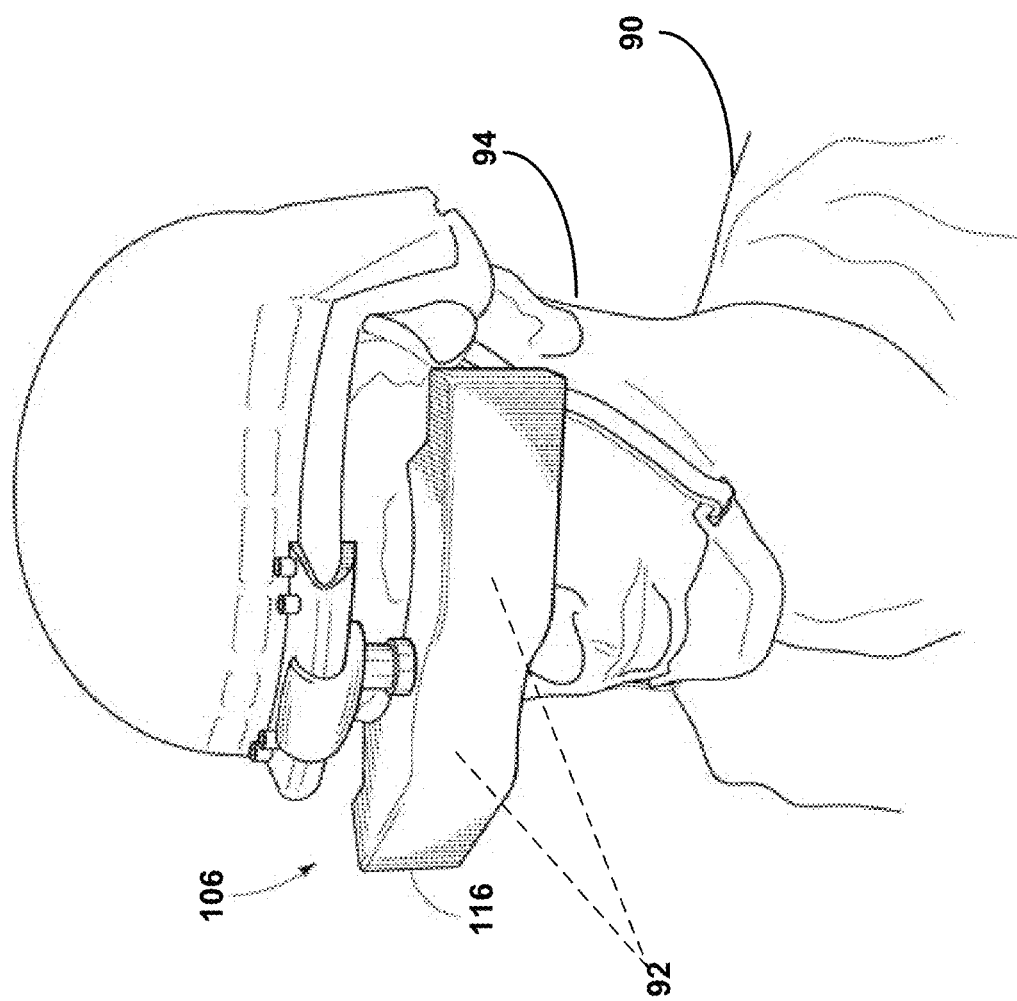
FIG. 4c is a perspective view diagram illustrating an example of user wearing a VRD visor apparatus.

FIG. 4c is a diagram illustrating an example of a perspective view of a VRD visor system 106 embodied in the form of an integrated VRD visor apparatus 116 that is worn on the head 94 of the user 90. Dotted lines are used with respect to element 92 because the eyes 92 of the user 90 are blocked by the apparatus 116 itself in the illustration.

B. Different Categories of Display Technology

The prior art includes a variety of different display technologies, including but not limited to DLP (digital light processing), LCD (liquid crystal displays), and LCOS (liquid crystal on silicon). FIG. 4d, which is a hierarchy diagram illustrating different categories of the system 100 based on the underlying display technology in which the system 200 can be implemented. The system 100 is intended for use as a DLP system 141, but could be potentially be used as an LCOS system 143 or even an LCD system 142 although the means of implementation would obviously differ and the reasons for implementation may not exist. The system 100 can also be implemented in other categories and subcategories of display technologies.

C. Immersion vs. Augmentation

FIG. 4e is a hierarchy diagram illustrating a hierarchy of systems 100 organized into categories based on the distinction between immersion and augmentation. Some embodiments of the system 100 can have a variety of different operating modes 120. An immersion mode 121 has the function of blocking out the outside world so that the user 90 is focused exclusively on what the system 100 displays to the user 90. In contrast, an augmentation mode 122 is intended to display visual images 200 that are superimposed over the physical environment of the user 90. The distinction between immersion and augmentation modes of the system 100 is particularly relevant in the context of near-eye systems 104 and visor systems 105.

Some embodiments of the system 100 can be configured to operate either in immersion mode or augmentation mode, at the discretion of the user 90. While other embodiments of the system 100 may possess only a single operating mode 120.

D. Display Only vs. Display/Detect/Track/Monitor

Some embodiments of the system 100 will be configured only for a one-way transmission of optical information. Other embodiments can provide for capturing information from the user 90 as visual images 880 and potentially other aspects of a media experience are made accessible to the user 90. FIG. 4f is a hierarchy diagram that reflects the categories of a one-way system 124 (a non-sensing operating mode 124) and a two-way system 123 (a sensing operating mode 123). A two-way system 123 can include functionality such as retina scanning and monitoring. Users 90 can be identified, the focal point of the eyes 92 of the user 90 can potentially be tracked, and other similar functionality can be provided. In a one-way system 124, there is no sensor or array of sensors capturing information about or from the user 90.

E. Media Players—Integrated vs. Separate

Display devices are sometimes integrated with a media player. In other instances, a media player is totally separate from the display device. By way of example, a laptop computer can include in a single integrated device, a screen for displaying a movie, speakers for projecting the sound that accompanies the video images, a DVD or BLU-RAY player for playing the source media off a disk. Such a device is also capable of streaming FIG. 4g is a hierarchy diagram illustrating a variety of different categories of systems 100 based on the whether the system 100 is integrated with a media player or not. An integrated media player system 107 includes the capability of actually playing media content as well as displaying the image 880. A non-integrated media player system 108 must communicate with a media player in order to play media content.

F. Users—Viewers vs. Operators

FIG. 4h is a hierarchy diagram illustrating an example of different roles that a user 90 can have. A viewer 96 can access the image 880 but is not otherwise able to control the functionality of the system 100. An operator 98 can control the operations of the system 100, but cannot access the image 880. In a movie theater, the viewers 96 are the patrons and the operator 98 is the employee of the theater.

G. Attributes of Media Content

Figure 4I:
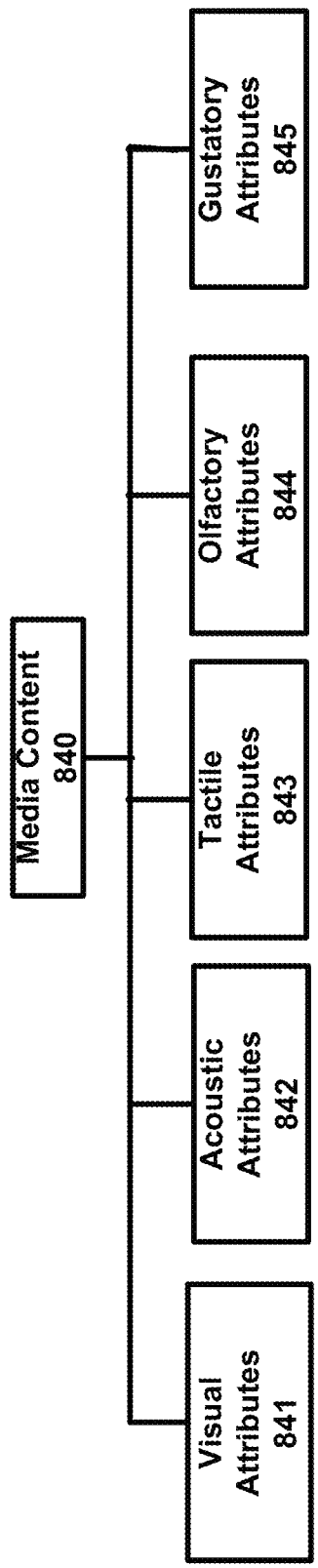
FIG. 4i is a hierarchy diagram illustrating an example of different attributes that can be associated with media content.

As illustrated in FIG. 4i, media content 840 can include a wide variety of different types of attributes. A system 100 for displaying an image 880 is a system 100 that plays media content 840 with a visual attribute 841. However, many instances of media content 840 will also include an acoustic attribute 842 or even a tactile attribute. Some new technologies exist for the communication of olfactory attributes 844 and it is only a matter of time before the ability to transmit gustatory attributes 845 also become part of a media experience in certain contexts.

Figure 4J:
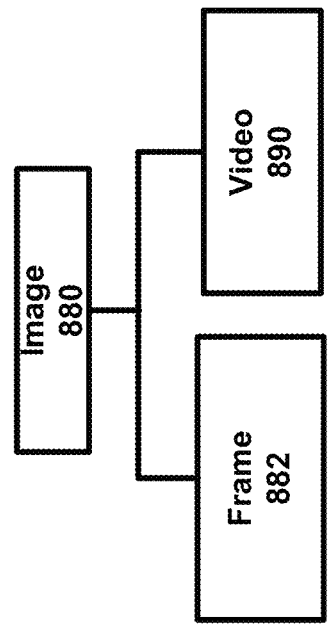
FIG. 4j is a hierarchy diagram illustrating examples of different contexts of images.

As illustrated in FIG. 4j, some images 880 are parts of a larger video 890 context. In other contexts, an image 880 can be stand-alone still frame 882.

VI. Glossary/Definitions

Table 1 sets forth a chart that correlates element numbers, element names, and element definitions/descriptions.

| # | Name | Definition/Description |
|---|------|------------------------|
| 80 | Environment | The physical environment in which the viewer 96 is located. The system 100 can be implemented in outdoor environments 80 as well as indoor environments 80. Examples of operating environments 80 can include but are not limited the inside a vehicle, such as a car, boat, or plane; large public places, such as an airport, park, shopping mall, auditorium, sports stadium, grocery store, or church; domestic environments such as a house, apartment, or hotel room; and work environments such as an office or factory. |
| 90 | User | A user 90 is a viewer 96 and/or operator 98 of the system 100. The user 90 is typically a human being. In alternative embodiments, users 90 can be different organisms such as dogs or cats, or even automated technologies such as expert systems, artificial intelligence applications, and other similar "entities". |
| 92 | Eye | An organ of the user 90 that provides for the sense of sight. The eye consists of different portions including but not limited to the sclera, iris, cornea, pupil, and retina. Some embodiments of the system 100 involve a VRD visor apparatus 116 that can project the desired image 880 directly onto the eye 92 of the user 90. |
| 94 | Head | The portion of the body of the user 90 that includes the eye 92. Some embodiments of the system 100 can involve a visor apparatus 115 that is worn on the head 94 of the user 90. |
| 96 | Viewer | A user 90 of the system 100 who views the image 880 provided by the system 100. All viewers 96 are users 90 but not all users 90 are viewers 96. The viewer 96 does not necessarily control or operate the system 100. The viewer 96 can be a passive beneficiary of the system 100, such as a patron at a movie theater who is not responsible for the operation of the projector or |

-continued

| # | Name | Definition/Description |
|---|---|---|
| | | someone wearing a visor apparatus 115 that is controlled by someone else. |
| 98 | Operator | A user 90 of the system 100 who exerts control over the processing of the system 100. All operators 98 are users 90 but not all users 90 are operators 98. The operator 98 does not necessarily view the images 880 displayed by the system 100 because the operator 98 may be someone operating the system 100 for the benefit of others who are viewers 96. For example, the operator 98 of the system 100 may be someone such as a projectionist at a movie theater or the individual controlling the system 100. |
| 100 | System | A collective configuration of assemblies, subassemblies, components, processes, and/or data that provide a user 90 with the functionality of engaging in a media experience by accessing a media content unit 840. Some embodiments of the system 100 can involve a single integrated apparatus 110 hosting all components of the system 100 while other embodiments of the system 100 can involve different non-integrated device configurations. Some embodiments of the system 100 can be large systems 102 or even giant system 101 while other embodiments of the system 100 can be personal systems 103, such as near-eye systems 104, visor systems 105, and VRD visor systems 106. Systems 100 can also be referred to as display systems 100. The system 100 is believed to be particularly useful in the context of personal system 103. |
| 101 | Giant System | An embodiment of the system 100 intended to be viewed simultaneously by a thousand or more people. Examples of giant systems 101 include scoreboards at large stadiums, electronic billboards such the displays in Time Square in New York City, and other similar displays. A giant system 101 is a subcategory of large systems 102. |
| 102 | Large System | An embodiment of the system 100 that is intended to display an image 880 to multiple users 90 at the same time. A large system 102 is not a personal system 103. The media experience provided by a large system 102 is intended to be shared by a roomful of viewers 96 using the same illumination assembly 200, imaging assembly 300, and projection assembly 400. Examples of large systems 102 include but are not limited to a projector/screen configuration in a movie theater, classroom, or conference room; television sets in sports bar, airport, or residence; and scoreboard displays at a stadium. Large systems 101 can also be referred to as large display systems 101. |
| 103 | Personal System | A category of embodiments of the system 100 where the media experience is personal to an individual viewer 96. Common examples of personal media systems include desktop computers (often referred to as personal computers), laptop computers, portable televisions, and near-eye systems 104. Personal systems 103 can also be referred to as personal media systems 103. Near-eye systems 104 are a subcategory of personal systems 103. |
| 104 | Near-Eye System | A category of personal systems 103 where the media experience is communicated to the viewer 96 at a distance that is less than or equal to about 12 inches (30.48 cm) away. Examples of near-eye systems 103 include but are not limited to tablet computers, smart phones, system 100 involving eyepieces, such as cameras, telescopes, microscopes, etc., and visor media systems 105, . Near-eye systems 104 can also be referred to as near-eye media systems 104. |
| 105 | Visor System | A category of near-eye media systems 104 where the device or at least one component of the device is worn on the head 94 of the viewer 96 and the image 880 is displayed in close proximity to the eye 92 of the user 90. Visor systems 105 can also be referred to as visor display systems 105. |
| 106 | VRD Visor System | VRD stands for a virtual retinal display. VRDs can also be referred to as retinal scan displays ("RSD") and as retinal projectors ("RP"). VRD projects the image 880 directly onto the retina of the eye 92 of the viewer 96. A VRD Visor System 106 is a visor system 105 that utilizes a VRD to display the image 880 on the eyes 92 of the user 90. A VRD visor system 106 can also be referred to as a VRD visor display system 106. |
| 110 | Apparatus | A device that provides a user 90 with the ability to engage in a media experience 840, i.e. interact with a media content unit 840. The apparatus 110 can be partially or even fully integrated with a media player 848. Many embodiments of the apparatus 110 will have a capability to communicate both acoustic attributes 842 and visual attributes 841 of the media experience 840 to the user 90. The apparatus 110 can include the illumination assembly 200, the imaging assembly 300, and the projection assembly 400. In some embodiments, the apparatus 110 includes the media player 848 |

-continued

| # | Name | Definition/Description |
|---|---|---|
| | | that plays the media content 840. In other embodiments, the apparatus 110 does not include the media player 848 that plays the media content 840. Different configurations and connection technologies can provide varying degrees of "plug and play" connectivity that can be easily installed and removed by users 90. |
| 111 | Giant Apparatus | An apparatus 110 implementing an embodiment of a giant system 101. Common examples of a giant apparatus 111 include the scoreboards at a professional sports stadium or arena. |
| 112 | Large Apparatus | An apparatus 110 implementing an embodiment of a large system 102. Common examples of large apparatuses 111 include movie theater projectors and large screen television sets. A large apparatus 111 is typically positioned on a floor or some other support structure. A large apparatus 111 such as a flat screen TV can also be mounted on a wall. |
| 113 | Personal Media Apparatus | An apparatus 110 implementing an embodiment of a personal system 103. Many personal apparatuses 112 are highly portable and are supported by the user 90. Other embodiments of personal media apparatuses 113 are positioned on a desk, table, or similar surface. Common examples of personal apparatuses 113 include desktop computers, laptop computers, and portable televisions. |
| 114 | Near-Eye Apparatus | An apparatus 110 implementing an embodiment of a near-eye system 104. Many near-eye apparatuses 114 are either worn on the head (are visor apparatuses 115) or are held in the hand of the user 90. Examples of near-eye apparatuses 114 include smart phones, tablet computers, camera eye-pieces and displays, microscope eye-pieces and displays, gun scopes, and other similar devices. |
| 115 | Visor Apparatus | An apparatus 110 implementing an embodiment of a visor system 105. The visor apparatus 115 is worn on the head 94 of the user 90. The visor apparatus 115 can also be referred simply as a visor 115. |
| 116 | VRD Visor Apparatus | An apparatus 110 in a VRD visor system 106. Unlike a visor apparatus 114, the VRD visor apparatus 115 includes a virtual retinal display that projects the visual image 200 directly on the eyes 92 of the user 90. A VRD visor apparatus 116 is disclosed in U.S. Pat. No. 8,982,014, the contents of which are incorporated by reference in their entirety. |
| 120 | Operating Modes | Some embodiments of the system 100 can be implemented in such a way as to support distinct manners of operation. In some embodiments of the system 100, the user 90 can explicitly or implicitly select which operating mode 120 controls. In other embodiments, the system 100 can determine the applicable operating mode 120 in accordance with the processing rules of the system 100. In still other embodiments, the system 100 is implemented in such a manner that supports only one operating mode 120 with respect to a potential feature. For example, some systems 100 can provide users 90 with a choice between an immersion mode 121 and an augmentation mode 122, while other embodiments of the system 100 may only support one mode 120 or the other. |
| 121 | Immersion | An operating mode 120 of the system 100 in which the outside world is at least substantially blocked off visually from the user 90, such that the images 880 displayed to the user 90 are not superimposed over the actual physical environment of the user 90. In many circumstances, the act of watching a movie is intended to be an immersive experience. |
| 122 | Augmentation | An operating mode 120 of the system 100 in which the image 880 displayed by the system 100 is added to a view of the physical environment of the user 90, i.e. the image 880 augments the real world. Google Glass is an example of an electronic display that can function in an augmentation mode. |
| 126 | Sensing | An operating mode 120 of the system 100 in which the system 100 captures information about the user 90 through one or more sensors. Examples of different categories of sensing can include eye tracking pertaining to the user's interaction with the displayed image 880, biometric scanning such as retina scans to determine the identity of the user 90, and other types of sensor readings/measurements. |
| 127 | Non-Sensing | An operating mode 120 of the system 100 in which the system 100 does not capture information about the user 90 or the user's experience with the displayed image 880. |
| 128 | Compacted | When the system 100 is not displaying images 880, the plate 340 can be transitioned to a "compacted" or "collapsed" state in order to conserve space. This can be particularly desirable in the context of visor apparatus 115 or VRD visor apparatus. |

-continued

| # | Name | Definition/Description |
|---|---|---|
| 140 | Display Technology | A technology for displaying images. The system 100 can be implemented using a wide variety of different display technologies. Examples of display technologies 140 include digital light processing (DLP), liquid crystal display (LCD), and liquid crystal on silicon (LCOS). Each of these different technologies can be implemented in a variety of different ways. |
| 141 | DLP System | An embodiment of the system 100 that utilizes digital light processing (DLP) to compose an image 880 from light 800. |
| 142 | LCD System | An embodiment of the system 100 that utilizes liquid crystal display (LCD) to compose an image 880 from light 800. |
| 143 | LCOS System | An embodiment of the system 100 that utilizes liquid crystal on silicon (LCOS) to compose an image 880 from light 800. |
| 150 | Supporting Components | Regardless of the context and configuration, a system 100 like any electronic display is a complex combination of components and processes. Light 800 moves quickly and continuously through the system 100. Various supporting components 150 are used in different embodiments of the system 100. A significant percentage of the components of the system 100 can fall into the category of supporting components 150 and many such components 150 can be collectively referred to as "conventional optics". Supporting components 150 can be necessary in any implementation of the system 100 in that light 800 is an important resource that must be controlled, constrained, directed, and focused to be properly harnessed in the process of transforming light 800 into an image 880 that is displayed to the user 90. The text and drawings of a patent are not intended to serve as product blueprints. One of ordinary skill in the art can devise multiple variations of supplementary components 150 that can be used in conjunction with the innovative elements listed in the claims, illustrated in the drawings, and described in the text. |
| 151 | Mirror | An object that possesses at least a non-trivial magnitude of reflectivity with respect to light. Depending on the context, a particular mirror could be virtually 100% reflective while in other cases merely 50% reflective. Mirrors 151 can be comprised of a wide variety of different materials, and configured in a wide variety of shapes and sizes. |
| 152 | Dichroic Mirror | A mirror 151 with significantly different reflection or transmission properties at two different wavelengths. |
| 160 | Lens | An object that possesses at least a non-trivial magnitude of transmissivity. Depending on the context, a particular lens could be virtually 100% transmissive while in other cases merely about 50% transmissive. A lens 160 is often used to focus and/or light 800. |
| 170 | Collimator | A device that narrows a beam of light 800. |
| 190 | Processor | A central processing unit (CPU) that is capable of carrying out the instructions of a computer program. The system 100 can use one or more processors 190 to communicate with and control the various components of the system 100. |
| 191 | Power Source | A source of electricity for the system 100. Examples of power sources include various batteries as well as power adaptors that provide for a cable to provide power to the system 100. Different embodiments of the system 100 can utilize a wide variety of different internal and external power sources. 191. Some embodiments can include multiple power sources 191. |
| 200 | Illumination Assembly | A collection of components used to supply light 800 to the imaging assembly 300. Common example of components in the illumination assembly 200 include light sources 210 and diffusers. The illumination assembly 200 can also be referred to as an illumination subsystem 200. |
| 210 | Light Source | A component that generates light 800. There are a wide variety of different light sources 210 that can be utilized by the system 100. |
| 211 | Multi-Prong Light Source | A light source 210 that includes more than one illumination element. A 3-colored LED lamp 213 is a common example of a multi-prong light source 212. |
| 212 | LED Lamp | A light source 210 comprised of a light emitting diode (LED). |
| 213 | 3 LED Lamp | A light source 210 comprised of three light emitting diodes (LEDs). In some embodiments, each of the three LEDs illuminates a different color, with the 3 LED lamp eliminating the use of a color wheel. |
| 214 | Laser | A light source 210 comprised of a device that emits light through a process of optical amplification based on the stimulated emission of electromagnetic radiation. |
| 215 | OLED Lamp | A light source 210 comprised of an organic light emitting diode (OLED). |

-continued

| # | Name | Definition/Description |
|---|---|---|
| 216 | CFL Lamp | A light source 210 comprised of a compact fluorescent bulb. |
| 217 | Incandescent Lamp | A light source 210 comprised of a wire filament heated to a high temperature by an electric current passing through it. |
| 218 | Non-Angular Dependent Lamp | A light source 210 that projects light that is not limited to a specific angle. |
| 219 | Arc Lamp | A light source 210 that produces light by an electric arc. |
| 230 | Light Location | A location of a light source 210, i.e. a point where light originates. Configurations of the system 100 that involve the projection of light from multiple light locations 230 can enhance the impact of the diffusers 282. |
| 300 | Imaging Assembly | A collective assembly of components, subassemblies, processes, and light 800 that are used to fashion the image 880 from light 800. In many instances, the image 880 initially fashioned by the imaging assembly 300 can be modified in certain ways as it is made accessible to the user 90. The modulator 320 is the component of the imaging assembly 300 that is primarily responsible for fashioning an image 880 from the light 800 supplied by the illumination assembly 200. |
| 310 | Prism | A substantially transparent object that often has triangular bases. Some display technologies 140 utilize one or more prisms 310 to direct light 800 to a modulator 320 and to receive an image 880 or interim image 850 from the modulator 320. Prisms 310 function as "traffic cops" for directing light 800 to the modular 320 so that the light 800 can be modulated. After the modulator 320 modifies the light 800, prisms 310 direct light away from the modulator 320 and towards the next step in the optic pathway 870. |
| 311 | TIR Prism | A total internal reflection (TIR) prism 310 used in a DLP 141 to direct light to and from a DMD 324. |
| 312 | RTIR Prism | A reverse total internal reflection (RTIR) prism 310 used in a DLP 141 to direct light to and from a DMD 324. |
| 320 | Modulator or Light Modulator | A device that regulates, modifies, or adjusts light 800. Modulators 320 form an image 880 or interim image 850 from the light 800 supplied by the illumination assembly 200. Common categories of modulators 320 include transmissive-based light modulators 321 and reflection-based light modulators 322. |
| 321 | Transmissive-Based Light Modulator | A modulator 320 that fashions an image 880 from light 800 utilizing a transmissive property of the modulator 320. LCDs are a common example of a transmissive-based light modulator 321. |
| 322 | Reflection-Based Light Modulator | A modulator 320 that fashions an image 880 from light 800 utilizing a reflective property of the modulator 320. Common examples of reflection-based light modulators 322 include DMDs 324 and LCOSs 340. |
| 324 | DMD | A reflection-based light modulator 322 commonly referred to as a digital micro mirror device. A DMD 324 is typically comprised of a several thousand microscopic mirrors arranged in an array on a processor 190, with the individual microscopic mirrors corresponding to the individual pixels in the image 880. |
| 326 | LCD Panel or LCD | A light modulator 320 in an LCD (liquid crystal display). A liquid crystal display that uses the light modulating properties of liquid crystals. Each pixel of an LCD typically consists of a layer of molecules aligned between two transparent electrodes, and two polarizing filters (parallel and perpendicular), the axes of transmission of which are (in most of the cases) perpendicular to each other. Without the liquid crystal between the polarizing filters, light passing through the first filter would be blocked by the second (crossed) polarizer. Some LCDs are transmissive while other LCDs are transflective. |
| 328 | LCOS Panel or LCOS | A light modulator 320 in an LCOS (liquid crystal on silicon) display. A hybrid of a DMD 324 and an LCD 330. Similar to a DMD 324, except that the LCOS 326 uses a liquid crystal layer on top of a silicone backplane instead of individual mirrors. An LCOS 244 can be transmissive or reflective. |
| 330 | Dichroid Combiner Cube | A device used in an LCOS or LCD display that combines the different colors of light 800 to formulate an image 880 or interim image 850. The dichroid combiner cube 330 can be an equivalent to a prism 310 in the context of an LCOS system 142 or an LCD system 143. |
| 340 | Plate | A substrate of material that possess some magnitude of reflectiveness 372 and some magnitude of transmissiveness 374. Some embodiments of the plate 340 can also impact the polarization 373 of light 800. In some embodiments, the optical effects of the plate 340 can substantially equal across the spectrum |

| # | Name | Definition/Description |
|---|---|---|
| | | 802 of light 800. In other embodiments, there can be vastly different optical effects in different ranges of the spectrum 802. The plate 340 can be implemented using a wide variety of materials such as glass 342 or plastic film 344. |
| 341 | Dynamic Plate | A plate 340 for which the optical characteristics of transmissiveness 373, reflectiveness 374, and/or polarization 373 can be modified across the entire spectrum 802 or for specific ranges within the spectrum 802 while the system 100 is generating images 880. In some embodiments of the dynamic plate 341, the plate 340 can change its characteristics on an image by image or even subframe by subframe basis. |
| 342 | Glass | A substantially hard and brittle substance, typically with transparent or translucent, made by fusing sand with soda, lime, and other ingredients that is rapidly cooled. Many embodiments of the plate 340 include a glass 342 component. Some embodiments of the plate 340 are comprised substantially or even entirely of glass 342. |
| 344 | Plastic Film | A synthetic material made from a wide range of polymers. Plastic film 344 can also be referred to simply as plastic 344. Many embodiments of the plate 340 can include a plastic 344 component |
| 345 | Modulated Film | A plastic film 344 that modulates the light 800 that comes into contact with the film 345. Examples of modulated films 345 include electrochromic, photochromic, and other types. Such films can be used to create a dynamic aperture 352 with desirable optical effects 860. |
| 346 | Layer | A substrate of material that comprises the plate 340. The plate 340 can be comprised of one or more layers 346. |
| 348 | Coating | A covering applied to a surface, such as a plate 340. Coatings can be comprised of glass 342, plastic film 344, and/or other components with desirable reflectiveness 372, polarization 373, and/or transmissiveness 374 attributes. |
| 350 | Aperture | A hole or opening. The plate 340 can include one or more apertures 350 to facilitate the transmission of light 800 though the aperture 350. |
| 352 | Dynamic Aperture | An aperture 350 that can provide for being dynamically opened, closed, broadened, narrowed, and/or changed in shape. This can be achieved in a variety of different ways, including means analogous to the shutter on a camera lens. |
| 360 | Gradient | An increase or decrease in the magnitude of one or more optical properties, such as reflectiveness 372, polarization 473, and/or transmissiveness 374 resulting from a different location on an object such as a plate 340. |
| 362 | Adjustable Gradient | A gradient 360 that provides for being dynamically modified while the system 100 is generating images 880. |
| 364 | Adjustable Diffractive Gradient | An adjustable gradient 362 where the function and purpose of the adjustable gradient 362 is to address the diffraction of light 800. |
| 372 | Reflectiveness or Reflectivity | The extent to which an object such as a plate 340 causes light 800 to reflect back. In many embodiments of the plate 340, the plate 340 will possess a level of reflectiveness 372 such that between about 40%-60% of light 800 striking the plate 340 to be reflected back. A plate 340 possessing a reflectivity of about 50% is desirable in many embodiments of the system 100. The system 100 can be implemented with a plate 340 possessing a wide variety of different magnitudes of reflectiveness 372 ranging from as little as about 0.5% up to about 99.5%. The reflectivity 372 of the plate 340 or other component of the system 100 can differentiate light 800 on the basis of the wavelength of the applicable light 800 (i.e. where in the light 800 falls in the spectrum 802. By way of example, the plate 340 can be less reflective 372 in the infrared spectrum 806 than in the visual spectrum 804 to facilitate eye-tracking functionality performed by the system 100. |
| 373 | Polarization or Polarity | Polarized light 800 is light 800 traveling in a substantially uniform orientation in which the vibrations in the light waves occur in a single place. Light 800 can be polarized through transmission 374, through reflection 372, through refraction, or by scattering. In some embodiments of the plate 340, the plate 340 can impact the polarity 373 of the light 800 that the plate comes into contact with. |
| 374 | Transmissiveness or Transmissivity | The extent to which an object such as a plate 340 allows light 800 to pass through the object. In many embodiments of the plate 340, the plate 340 will possess a level of transmissivity 374 such that between about 40%-60% of light 800 striking the plate 340 can pass through. A plate 340 possessing a transmissiveness of about 50% is desirable in many embodiments of the system 100. The system 100 can be implemented with a plate 340 possessing a |

-continued

| # | Name | Definition/Description |
|---|---|---|
| | | wide variety of different magnitudes of transmissivity 374 ranging from as little as about 0.5% up to about 99.5%. |
| 380 | Optical Effect | A modification to the displayed image 880 that is desirable based on the context of the displayed image 800. By way of example, in augmentation mode 122 a desired optical effect 380 may be shading to create the color black in the image 880. |
| 382 | Holographic Element | The plate 340 can include or be comprised of one or more holographic elements 382. A holographic element 382 is an optical component, such as a lens, filter, beam splitter, or diffraction grating. A holographic element 382 can be produced using holographic imaging processes or principles. Dichromated gelatin and photoresist are among the holographic recording materials used in forming holographic elements 382. |
| 384 | Micro Lens Array | The plate 340 can include or be comprised of an array of very small lenses. A micro lens array 384 can also be referred to as a textured plated 384. |
| 390 | Collapsible Plate | A plate 340 that provides for entering into a collapsed or compacted mode 128 when the system 100 is not being used to display an image 880. |
| 400 | Projection Assembly | A collection of components used to make the image 880 accessible to the user 90. The projection assembly 400 includes a display 410. The projection assembly 400 can also include various supporting components 150 that focus the image 880 or otherwise modify the interim image 850 transforming it into the image 880 that is displayed to one or more users 90. The projection assembly 400 can also be referred to as a projection subsystem 400. |
| 410 | Display or Screen | An assembly, subassembly, mechanism, or device by which the image 880 is made accessible to the user 90. Examples of displays 410 include active screens 412, passive screens 414, eyepieces 416, and VRD eyepieces 418. |
| 412 | Active Screen | A display screen 410 powered by electricity that displays the image 880. |
| 414 | Passive Screen | A non-powered surface on which the image 880 is projected. A conventional movie theater screen is a common example of a passive screen 412. |
| 416 | Eyepiece | A display 410 positioned directly in front of the eye 92 of an individual user 90. |
| 418 | VRD Eyepiece or VRD Display | An eyepiece 416 that provides for directly projecting the image 880 on the eyes 92 of the user 90. A VRD eyepiece 418 can also be referred to as a VRD display 418. |
| 420 | Curved Mirror | An at least partially reflective surface that in conjunction with the splitting plate, a plate 340, or other similar component to project the image 880 onto the eye 92 of the viewer 96. The curved mirror 420 can perform additional functions in embodiments of the system 100 that include a sensing mode 126 and/or an augmentation mode 122. |
| 500 | Sensor Assembly | The sensor assembly 500 can also be referred to as a tracking assembly 500. The sensor assembly 500 is a collection of components that can track the eye 92 of the viewer 96 while the viewer 96 is viewing an image 880. The tracking assembly 500 can include an infrared camera 510, and infrared lamp 520, and variety of supporting components 150. The assembly 500 can also include a quad photodiode array or CCD. |
| 510 | Sensor | A component that can capture an eye-tracking attribute 530 from the eye 92 of the viewer 96. The sensor 510 is typically a camera, such as an infrared camera. |
| 511 | External Camera | A sensor 510 that captures images of the exterior operating environment 80. |
| 512 | Microphone | A sensor 510 that captures sounds of the exterior operating environment 80. |
| 513 | Motion Sensor | A sensor 510 that detects motion in the operating environment 80. |
| 514 | Position Sensor | A sensor 510 that identifies a location of the apparatus 110. |
| 520 | Lamp | A light source for the sensor 510. For embodiments of the sensor 510 involving a camera 510, a light source is typically very helpful. In some embodiments, the lamp 520 is an infrared lamp and the camera is an infrared camera. This prevents the viewer 96 from being impacted by the operation of the sensor assembly 500. |
| 530 | Eye-Tracking Attribute | An attribute pertaining to the movement and/or position of the eye 92 of the viewer 96. Some embodiments of the system 100 can be configured to selectively influence the focal point 870 of light 800 in an area of the image 880 based on one or more eye-tracking attributes 530 measured or captured by the sensor assembly 500. |
| 550 | Output Devices | A device or component that communicates some aspect of the media experience 840 to the user 90. The system 100 can utilize a wide variety of output devise 550, many of which may be stand-alone, non-integrated, plug and play types of components. Common examples of output devices 550 include speakers 560 |

-continued

| # | Name | Definition/Description |
|---|---|---|
| | | and displays 410. Any mechanism for providing output or feedback to a user 90 in the prior art can be incorporated into the system 100. |
| 560 | Speaker | A device or component that can communicate the acoustic attributes 843 from the media content 840 to the user 90 of the apparatus 110. Common examples of speakers 560 include headphones and earphones. |
| 570 | Haptic Feedback Component | A device or component that can provide haptic feedback to the user 90. |
| 600 | Augmentation Assembly | A collection of components that provide for allowing or precluding an exterior environment image 650 from reaching the eye 92 of the viewer 96. |
| 610 | Shutter Component | A device that provides for either allowing or disallowing exterior light from reaching the eyes 92 of the viewer 96 while the apparatus 110 is being worn by the viewer 96. |
| 620 | Window | A passageway for light from the exterior environment in an embodiment that is not fully immersive. |
| 650 | Exterior Light | The surroundings of the system 100 or apparatus 110. Some embodiments of the system 100 can factor in lighting conditions of the exterior environment 650 in supplying light 800 for the display of images 880. |
| 700 | Parameters | An at least substantially comprehensive compilation of different ways in which the apparatus 110 can operate. The particular configuration 705 of parameters 700 that will be operable at any particular time will depend on the defining of one or more triggers 750. Examples of categories of parameters 700 include but are not limited to a sound parameter 710, a display parameter 720, a progression parameter 730, and a haptic parameter 740. |
| 705 | Configuration | A subset of operating parameters 700 from the universe of potential operating parameters 700. Different triggers 750 can result in different configurations 705. The system 100 can be implemented to facilitate automatic changes from one configuration 705 of parameters 700 to another configuration 705 of parameters 700 based on or more triggers 750. |
| 710 | Sound Parameters | A parameter 700 pertaining to the communication of acoustic attributes 842 in the media experience 840 by the system 100 to the user 90. Examples of sound parameters 710 can include but are not limited to an off/mute 711, a temporarily reduced volume 712, an alert 713, an external sound amplification 714, a message 715, an ongoing volume change 716. |
| 711 | Off/Mute | The sound parameter 710 where sound ceases to be communicated by the system 100 to the user 90. |
| 712 | Temporarily Reduced Volume | The sound parameter 710 where sound is temporarily reduced in volume for a predefined period of time. This can serve as a notification to the user 90 as well as provide the user 90 with a time to react to the applicable trigger 750. |
| 713 | Alert | An audible notification can be communicated to the user 90. |
| 714 | External Sound Amplification | In addition to or in conjunction with a reduction in the volume of the media experience, the system 100 can import sounds from the environment 80 that are captured via a microphone or other similar sensor and the play that sound through the speakers 560 of the system 100. |
| 715 | Ongoing Volume Change | The sound parameter 710 where the volume is changed on a non-temporary (i.e. ongoing basis). |
| 720 | Display Parameters | A parameter 700 pertaining to the communication of visual attributes 841 in the media experience 840 to the user 90 by the system 100. Examples of display parameters 720 can include but are not limited to an off 721, a dimmed display 722, an an/external view 723, an on/augmented view 724, a flash 725, a verbal alert 726, and an in increased brightness 727. Display parameters 720 can be temporary (for a pre-defined period of time) or ongoing. |
| 721 | Off | A display parameter 720 where the communication of visual images ceases. |
| 722 | Dimmed | A display parameter 720 where the display 410 is dimmed, i.e. images 880 are displayed with light of reduced intensity. |
| 723 | Off/External View | A display parameter 720 where the media content 840 is shut off, but a view of the operating environment 80 is displayed through a window or through the display 410. |
| 724 | On/Augmented View | A display parameter 720 where media content 840 continues to play, but in an augmentation mode 122. |
| 725 | Flash | A display parameter 720 where media content 840 continues to play, but the display 410 flashes a few short pulses to notify the user 90. |
| 726 | Written Alert | A display parameter 720 that involves a written notification being overlaid on the display 410. |

-continued

| # | Name | Definition/Description |
|---|---|---|
| 727 | Increased Brightness | A display parameter 720 that involves a temporary increase in the brightness of the image 880 being displayed. |
| 730 | Progression Parameters | A parameter 700 pertaining to sequential progression of the media experience. Examples of progression parameters 730 can include but are not limited to a stop 731, a pause 732, and a timed-pause 733. |
| 731 | Stop | A progression parameter 730 where the media experience 840 stops playing. |
| 732 | Pause | A progression parameter 730 where the media experience 840 is paused. |
| 733 | Timed-Pause | A progression parameter 730 where the media experience 840 is paused for a specified period of time, before the media experience 840 automatically starts playing again. |
| 734 | Play | A progression parameter 730 that involves the continued playing the media experience 840. |
| 735 | Bookmark | A progression parameter 730 that involves marking the point in time in the media experience 840 when a particular trigger 750 occurred. |
| 740 | Haptic | A category of parameters 700 that can be configured by the system 100. Haptic communication typically involves vibration of a device. In more involved/immersive systems 100, it might include a chair or other devices. |
| 741 | Haptic Alert | The invocation of vibration to alert the user 90 to something. Haptic alerts 741 can be effective way to get the attention of a user 90 engaged in primarily visual and/or acoustic content. |
| 742 | Muted Haptic | For a media experience 840 that involves haptic feedback, the ability to mute that feedback can be a desirable parameter 700. |
| 743 | Increase Haptic | One way to get the attention of a user 90 is to increase the magnitude of haptic feedback. |
| 744 | Decrease Haptic | A decrease in the magnitude of the haptic communication from the system 100 or apparatus 110 to the user 90. |
| 750 | Trigger | An event defined with respect to one or more inputs that is linked to one or more configurations 705. Examples of different categories of triggers 750 include but are not limited to user actions 760 and environmental stimuli 780. |
| 760 | User Action | An activity by a user 90 that is linked or can be linked to a change in the configuration 705 of the system 100. Examples of user actions 760 can include but are not limited to use or manipulation of a user control 761, an eye-movement gesture 762, a kinetic gesture 763, a pre-defined user gesture 764, an input from peripheral device 765, a pre-defined voice command 766, and a pre-defined schedule 767. |
| 761 | User Control | A user action 760 that involves the use or manipulation of a user control, such as a button, joystick, keypad, etc. |
| 762 | Eye-Movement Gesture | A user action 760 that involves the movement of the eye 92 of the user 90. |
| 763 | Kinetic Gesture | A user action 760 that involves the motion of the user 90. |
| 764 | Pre-Defined Gesture | User A user action 760 that involves a gesture pre-defined by the user 90. |
| 765 | Peripheral Device Input | A user action 760 that is in the form of an input received through a peripheral device. |
| 766 | Pre-Defined Voice Command | A user action 760 that is in the form of a voice command captured through a microphone or similar sensor. |
| 767 | Pre-Defined Schedule | A user action 760 in the form of a scheduled date/time. For example, the system 100 can be used as an alarm clock in some contexts. In other contexts, a user 90 can set alarms such as when playing video games and wanting to avoid forgetting about the time and being late for a dinner date. |
| 780 | Environmental Stimulus | An condition or attribute from the operating environment 780 that is linked or can be linked to a change a change in the configuration 705 of the system 100. Examples of environmental stimuli 780 can include but are not limited to an external sounds 781, an external light 782, a detected location 783, a detected proximity 784, a detected motion 785, and an external communication 785. |
| 781 | External Sound | A sound from the operating environment 80 that is captured by a microphone. |
| 782 | External Light | A temporary pulse of light or a continuous source of light in the operating environment 80. |
| 783 | Detected Location | A GPS location. This can be a highly useful trigger 750 for a user 90 who is traveling. |
| 784 | Detected Proximity | The detection of an object in close proximity to the user 90 and/or apparatus 110. |
| 785 | Detected Motion | The detection of a moving object in the operating environment 80. |
| 786 | External Communication | A phone call, e-mail, text message, or other form of communication that can be routed by the user 90 through the system 100. By way of example, important communications can be differentiated based |

-continued

| # | Name | Definition/Description |
|---|---|---|
| 800 | Light | on the type of communication and the other person involved in the communication. It is anticipated that users 90 may route e-mail, phone calls, and other communications through the apparatus 110. Light 800 is the media through which an image is conveyed, and light 800 is what enables the sense of sight. Light is electromagnetic radiation that is propagated in the form of photons. |
| 802 | Spectrum | Light 800 can be differentiated and categorized on the basis of wavelength. The spectrum 802 of light 800 is a range of light 800 that includes very long wavelength light 800 (the infrared spectrum 806) through very short wavelength light 800 (the ultraviolet spectrum 807), including light 800 in the visible spectrum 804. Light 800 at different parts of the spectrum 802 will be of different colors. |
| 803 | Full Spectrum | Light 800 for which certain portions of the spectrum 802 are not blocked or differentiated. For example, many embodiments of the plate 340 will be full spectrum 803 processors of light even though only the visual spectrum 804 is used to comprise the image 880. |
| 804 | Visual Spectrum or Visible Spectrum | The portions of the full spectrum 802 in which light 800 is visible to the human eye. The visual spectrum 804 is comprised of light that is red, orange, yellow, green, blue, indigo, and violet. |
| 805 | Partial Visual Spectrum | A subset of the visual spectrum 804. Different embodiments of the plate 340 can possess light impacting attributes such as different reflective 432, transmissiveness 434, and/or polarization 433, for different subsets of the visible spectrum 804. |
| 806 | Infrared Spectrum | The portion of the spectrum 802 that is not visible to the human eye and has a longer wavelength than light 800 in the visible spectrum 804. |
| 807 | Ultraviolet Spectrum | The portion of the spectrum 802 that is not visible to the human eye and has a shorter wavelength than light 800 in the visible spectrum 804. |
| 810 | Pulse | An emission of light 800. A pulse 810 of light 800 can be defined with respect to duration, wavelength, and intensity. |
| 840 | Media Content | The image 880 displayed to the user 90 by the system 100 can in many instances, be but part of a broader media experience. A unit of media content 840 will typically include visual attributes 841 and acoustic attributes 842. Tactile attributes 843 are not uncommon in certain contexts. It is anticipated that the olfactory attributes 844 and gustatory attributes 845 may be added to media content 840 in the future. |
| 841 | Visual Attributes | Attributes pertaining to the sense of sight. The core function of the system 100 is to enable users 90 to experience visual content such as images 880 or video 890. In many contexts, such visual content will be accompanied by other types of content, most commonly sound or touch. In some instances, smell or taste content may also be included as part of the media content 840. |
| 842 | Acoustic Attributes | Attributes pertaining to the sense of sound. The core function of the system 100 is to enable users 90 to experience visual content such as images 880 or video 890. However, such media content 840 will also involve other types of senses, such as the sense of sound. The system 100 and apparatuses 110 embodying the system 100 can include the ability to enable users 90 to experience tactile attributes 843 included with other types of media content 840. |
| 843 | Tactile Attributes | Attributes pertaining to the sense of touch. Vibrations are a common example of media content 840 that is not in the form of sight or sound. The system 100 and apparatuses 110 embodying the system 100 can include the ability to enable users 90 to experience tactile attributes 843 included with other types of media content 840. |
| 844 | Olfactory Attributes | Attributes pertaining to the sense of smell. It is anticipated that future versions of media content 840 may include some capacity to engage users 90 with respect to their sense of smell. Such a capacity can be utilized in conjunction with the system 100, and potentially integrated with the system 100. The iPhone app called oSnap is a current example of gustatory attributes 845 being transmitted electronically. |
| 845 | Gustatory Attributes | Attributes pertaining to the sense of taste. It is anticipated that future versions of media content 840 may include some capacity to engage users 90 with respect to their sense of taste. Such a capacity can be utilized in conjunction with the system 100, and potentially integrated with the system 100. |
| 848 | Media Player | The system 100 for displaying the image 880 to one or more users 90 may itself belong to a broader configuration of applications and systems. A media player 848 is device or configuration of devices that provide the playing of media content 840 for users. Examples of media players 848 include disc players such as DVD players |

| #   | Name                              | Definition/Description |
|-----|-----------------------------------|------------------------|
|     |                                   | and BLU-RAY players, cable boxes, tablet computers, smart phones, desktop computers, laptop computers, television sets, and other similar devices. Some embodiments of the system 100 can include some or all of the aspects of a media player 848 while other embodiments of the system 100 will require that the system 100 be connected to a media player 848. For example, in some embodiments, users 90 may connect a VRD apparatus 116 to a BLU-RAY player in order to access the media content 840 on a BLU-RAY disc. In other embodiments, the VRD apparatus 116 may include stored media content 840 in the form a disc or computer memory component. Non-integrated versions of the system 100 can involve media players 848 connected to the system 100 through wired and/or wireless means. |
| 850 | Interim Image                     | The image 880 displayed to user 90 is created by the modulation of light 800 generated by one or light sources 210 in the illumination assembly 200. The image 880 will typically be modified in certain ways before it is made accessible to the user 90. Such earlier versions of the image 880 can be referred to as an interim image 850. |
| 860 | Optical Effect                    | A modification to the displayed image 880 that is desirable based on the context of the displayed image 800. By way of example, in augmentation mode 122 a desired optical effect 380 may be shading to create the color black in the image 880. |
| 870 | Optical Chain or Optical Pathway  | The travel path of light 800 within the system 100, beginning with one or more light sources 210 in the illumination assembly 200 and ending with the image 880 displayed in a location that is accessible to the viewer 96. |
| 880 | Image                             | A visual representation such as a picture or graphic. The system 100 performs the function of displaying images 880 to one or more users 90. During the processing performed by the system 100, light 800 is modulated into an interim image 850, and subsequent processing by the system 100 can modify that interim image 850 in various ways. At the end of the process, with all of the modifications to the interim image 850 being complete the then final version of the interim image 850 is no longer a work in process, but an image 880 that is displayed to the user 90. In the context of a video 890, each image 880 can be referred to as a frame 882. |
| 881 | Stereoscopic Image                | A dual set of two dimensional images 880 that collectively function as a three dimensional image. |
| 882 | Frame                             | An image 880 that is a part of a video 890. |
| 890 | Video                             | In some instances, the image 880 displayed to the user 90 is part of a sequence of images 880 can be referred to collectively as a video 890. Video 890 is comprised of a sequence of static images 880 representing snapshots displayed in rapid succession to each other. Persistence of vision in the user 90 can be relied upon to create an illusion of continuity, allowing a sequence of still images 880 to give the impression of motion. The entertainment industry currently relies primarily on frame rates between 24 FPS and 30 FPS, but the system 100 can be implemented at faster as well as slower frame rates. |
| 891 | Stereoscopic Video                | A video 890 comprised of stereoscopic images 881. |
| 900 | Method                            | A process for displaying an image 880 to a user 90. |
| 910 | Illumination Method               | A process for generating light 800 for use by the system 100. The illumination method 910 is a process performed by the illumination assembly 200. |
| 920 | Imaging Method                    | A process for generating an interim image 850 from the light 800 supplied by the illumination assembly 200. The imaging method 920 can also involve making subsequent modifications to the interim image 850. |
| 930 | Display Method                    | A process for making the image 880 available to users 90 using the interim image 850 resulting from the imaging method 920. The display method 930 can also include making modifications to the interim image 850. |

The invention claimed is:

1. A system for displaying an image comprised of a plurality of light to a viewer, said system comprising:
    an illumination assembly that provides for generating a plurality of light; and
    an imaging assembly that provides for creating said image from said plurality of light, said imaging assembly including:
        a digital micro mirror device (DMD) that provides for modulating said light into said image; and
        a plate that provides for reflecting a first portion of said light from said illumination assembly to said DMD and a second portion of said light transmitted through the plate and becoming lost light, and the plate further for directing said light from said DMD towards a display.

2. The system of claim 1, wherein said plate includes an aperture.

3. The system of claim 1, wherein said plate includes a plastic film.

4. The system of claim 3, wherein said plastic film is a modulated film that modifies said light in forming said image, and wherein said modulated film generates a desired optical effect.

5. The system of claim 1, wherein said plate is comprised of a plurality of films and wherein said plate is not comprised of a glass.

6. The system of claim 1, wherein said plate includes a plurality of modulated films that provide for a dynamic aperture.

7. The system of claim 1, wherein said system is a visor apparatus that includes an eyepiece, and wherein said eyepiece includes said display.

8. The system of claim 1, wherein said plate includes a plastic film with an adjustable diffractive gradient.

9. The system of claim 1, wherein said plate includes a glass and a plastic film.

10. The system of claim 1, wherein said plate has a reflectiveness that pertains to one of a full spectrum or a partial spectrum.

11. The system of claim 1, wherein said plate has a reflectiveness between 40% and 60%, such that between 60% and 40% of light incident upon the plate becomes the lost light.

12. The system of claim 1, wherein said plate provides for the polarization of said light.

13. The system of claim 1, wherein said plate is a micro lens array.

14. The system of claim 1, wherein said plate is a collapsible plate that collapses into a smaller volume of space.

15. A system for displaying an image comprised of a plurality of light to a viewer, said system comprising:
- an illumination assembly that provides for supplying said plurality of light to an imaging assembly, wherein said illumination assembly includes a light source;
- said imaging assembly that provides for modulating said light into at an interim image, said imaging assembly including:
  - a digital micro mirror device (DMD) that provides for modulating said light into said interim image; and
  - a plate that provides for reflecting a first portion of said light from said illumination assembly to said DMD and a second portion of said light transmitted through the plate and becoming lost light, and the plate further for directing said light from said DMD towards a projection assembly; and
- said projection assembly providing for the display of said image on a display from said interim image.

16. The system of claim 15, wherein said system is a VRD visor apparatus, and wherein said display is part of an eyepiece for said VRD visor apparatus.

17. The system of claim 15, wherein said plate includes a glass and a plurality of plastic films including a first plastic film on a first side of said glass and a second plastic film on a second side of said glass.

18. The system of claim 15, wherein said plate is includes an aperture and a plastic film, wherein said plastic film is a modulated film that modifies said light, and wherein said modulated film generates a desired optical effect.

19. The system of claim 15, wherein said plate includes a plurality of modulated films that provide for a dynamic aperture, and wherein said plate includes a plastic film with an adjustable diffractive gradient.

20. The system of claim 1, wherein the plate is a dynamic plate for which optical characteristics of transmissiveness, reflectiveness, and/or polarization are modified while the system is generating the images.

21. The system of claim 15, wherein said plate has a reflectiveness between 40% and 60%, such that between 60% and 40% of light incident upon the plate becomes the lost light.

22. The system of claim 1, wherein said plate has a reflectiveness between 95% and 5%, such that between 95% and 5% of light incident upon the plate becomes the lost light.

* * * * *